United States Patent
Boyle

(10) Patent No.: US 10,917,123 B2
(45) Date of Patent: Feb. 9, 2021

(54) N-PLEXER FILTERING FOR COUPLED ANTENNAS

(71) Applicant: Qualcomm Incorporated, San Diego, CA (US)

(72) Inventor: Kevin Robert Boyle, Horsham (GB)

(73) Assignee: QUALCOMM Incorporated, San Diego, CA (US)

( * ) Notice: Subject to any disclaimer, the term of this patent is extended or adjusted under 35 U.S.C. 154(b) by 42 days.

(21) Appl. No.: 16/147,374

(22) Filed: Sep. 28, 2018

(65) Prior Publication Data

US 2020/0106464 A1 Apr. 2, 2020

(51) Int. Cl.
- *H04L 5/02* (2006.01)
- *H04B 1/00* (2006.01)
- *H04L 5/06* (2006.01)
- *H04B 1/50* (2006.01)

(52) U.S. Cl.
CPC ............ *H04B 1/0057* (2013.01); *H04B 1/50* (2013.01); *H04L 5/06* (2013.01)

(58) Field of Classification Search
None
See application file for complete search history.

(56) References Cited

U.S. PATENT DOCUMENTS

| | | | | |
|---|---|---|---|---|
| 3,815,137 A * | 6/1974 | Kaegebein | ............ | H01P 1/2133 370/339 |
| 6,525,624 B1 * | 2/2003 | Hikita | ............ | H03H 7/0161 333/133 |
| 6,862,441 B2 * | 3/2005 | Ella | ............ | H03H 9/542 455/114.2 |
| 7,376,440 B2 | 5/2008 | Forrester et al. | | |
| 9,413,413 B2 * | 8/2016 | Murase | ............ | H04B 1/44 |
| 9,859,943 B2 | 1/2018 | Khlat et al. | | |
| 9,979,531 B2 * | 5/2018 | Schwent | ............ | H04B 1/0057 |
| 9,998,168 B2 * | 6/2018 | Khlat | ............ | H04B 1/40 |
| 10,079,615 B2 * | 9/2018 | Yosui | ............ | H04B 1/12 |
| 10,382,009 B2 * | 8/2019 | Nosaka | ............ | H04B 1/006 |

(Continued)

OTHER PUBLICATIONS

Li M., et al., "A Fully Matched LTE—A Carrier Aggregation Quadplexer Based on BAW and SAW Technologies", IEEE International Ultrasonics Symposium Proceedings, 2014, pp. 77-80.

(Continued)

*Primary Examiner* — Tuan A Tran
(74) *Attorney, Agent, or Firm* — QUALCOMM Incorporated

(57) ABSTRACT

An apparatus is disclosed for N-plexer filtering for coupled antennas. In example implementations, an apparatus includes a first antenna, a second antenna, a first receiver unit tuned to a first frequency band, and a second receiver unit tuned to a second frequency band. The apparatus also includes multiple antenna feed lines. A first antenna feed line is coupled between the first antenna and the first receiver unit. A second antenna feed line is coupled between the second antenna and the second receiver unit. The second antenna feed line comprises an N-plexer that includes multiple paths. A first path is coupled to the second antenna. A second path is coupled to the second receiver unit and includes a resonator configured to cause the first frequency band to be reflected.

26 Claims, 11 Drawing Sheets

(56) References Cited

U.S. PATENT DOCUMENTS

| | | | | |
|---|---|---|---|---|
| 10,476,534 B2* | 11/2019 | Khlat | ............... | H01Q 1/523 |
| 10,505,505 B2* | 12/2019 | Obiya | ............... | H03G 3/3042 |
| 10,587,292 B2* | 3/2020 | Elbrecht | ............... | H04B 1/0057 |
| 2014/0185498 A1* | 7/2014 | Schwent | ............... | H04B 1/0057 |
| | | | | 370/297 |

OTHER PUBLICATIONS

Lim S.P., et al., "High-Level Embedded Passive Triplexer and Quintplexer Module into Organic Packaging Substrate", Proceedings of the 38th European Microwave Conference, Oct. 2008, pp. 638-641.

* cited by examiner

N-PLEXER FILTERING FOR COUPLED ANTENNAS

TECHNICAL FIELD

This disclosure relates generally to wireless communications with electronic devices and, more specifically, to ameliorating the effects of coupled antennas using filtering in an n-plexer that is part of a radio-frequency front-end (RFFE).

BACKGROUND

Electronic devices include traditional computing devices such as desktop computers, notebook computers, smartphones, wearable devices like a smartwatch, internet servers, and so forth. However, electronic devices also include other types of computing devices such as personal voice assistants, thermostats, automotive electronics, robotics, devices embedded in other machines like refrigerators and industrial tools, Internet of Things (IoT) devices, and so forth. These various electronic devices provide services relating to productivity, remote communication, social interaction, security, health and safety, entertainment, transportation, and information dissemination. Thus, electronic devices play crucial roles in many aspects of modern society.

Many of the services provided by electronic devices in today's interconnected world depend at least partly on electronic communications. Electronic communications include, for example, those exchanged between or among different electronic devices using wireless or wired signals that are transmitted over one or more networks, such as the Internet or a cellular network. Electronic communications therefore include both wireless and wired transmissions and receptions. To make such electronic communications, an electronic device uses a transceiver (e.g., a transmitter and/or receiver), such as a wireless transceiver that is coupled to one or more antennas.

Electronic communications can be realized by propagating signals between two wireless transceivers at two different electronic devices. For example, using a wireless transmitter, a smart phone can transmit a wireless signal to a base station over an air medium as part of an uplink communication to support mobile services. Using a wireless receiver, the smart phone can receive a wireless signal from the base station via the air medium as part of a downlink communication to enable mobile services. With a smart phone, mobile services can include phone and video calls, social media interactions, messaging, watching movies, sharing videos, performing searches, acquiring map information or navigational instructions, locating friends, transferring money, obtaining another service like a car ride, health monitoring and alerting, and so forth. To enable electronic devices to provide such an array of services, more and more components are being packed into each wireless device.

Meanwhile, the wireless industry is attempting to make ever smaller equipment capable of wireless communications to support new use cases. For example, it is planned for next-generation wireless networks to enable hundreds of billions of more devices to connect to the internet. This is sometimes called the "Internet of Things" (IoT). These IoT devices may include inexpensive and low-powered devices that are also smaller than smartphones, and even smartwatches. Thus, the wireless industry is expected to enable a multitude of wireless components to be packed into smaller and smaller form factors to provide a path for the growth of IoT devices.

Thus, the space available within electronic devices to house a myriad of components is decreasing in absolute terms for some wireless devices that support ever smaller former factors, such as those of smartwatches and many IoT devices. Further, the space available within electronic devices to house a myriad of components is decreasing in relative terms due to the increasing number of features that wireless devices are expected to provide, which can increase component density even within devices of fairly constant size. Consequently, electrical engineers and other designers of electronic devices are striving to develop techniques that enable wireless components to fit and correctly interoperate within the confines of smaller and smaller amounts of space.

SUMMARY

As electronic devices become smaller, there is less room to pack wireless components into their housings. Additionally, as the number of different features that electronic devices provide increases, a greater quantity of components are expected to be included within each given device housing. Due to one or both factors, there can be increasingly less space to accommodate the various components used to enable the features and services provided by electronic devices. For example, antennas are becoming crowded within the housings of electronic devices, especially those that are hand-held, portable, or otherwise relatively small.

This increasing crowdedness is due to several reasons. First, antennas generally provide superior signal reception and electromagnetic emanation if the antennas are distributed around an exterior of a device housing to avoid being blocked by internal components. Thus, the set of available locations can be constrained for antenna components. Second, respective antennas for different purposes are deployed to handle signaling for different types of wireless communication, such as those for cellular, Wi-Fi, Bluetooth®, Global Positioning System (GPS), and so forth. Third, multiple antennas for each type of wireless communication may be included to support multiple input, multiple output (MIMO) operations. Consequently, due to any one or more of these reasons, two or more antennas may be positioned proximate to each other on an electronic device. Such proximity can result in two or more antennas being electromagnetically coupled with each other, which can adversely affect the ability of the antennas to transmit or receive a signal.

To counteract antenna coupling, filtering using an N-plexer can be implemented as described herein. In some implementations, respective antennas of multiple antennas are coupled to respective antenna feed lines of multiple antenna feed lines. Each antenna feed line is coupled to at least one transceiver unit (e.g., at least one transmitter unit and/or at least one receiver unit) of multiple transceiver units of a wireless transceiver (e.g., at least one wireless transmitter and/or at least one wireless receiver). Each respective transceiver unit corresponds to a respective frequency band. In example operations, a first antenna of the multiple antennas propagates a first signal along a first antenna feed line of the multiple antenna feed lines to a first transceiver unit that corresponds to a first frequency band. A second antenna of the multiple antennas propagates a second signal along a second antenna feed line of the multiple antenna feed lines to a second transceiver unit that corresponds to a second frequency band.

The second antenna can, however, adversely impact the transmission or reception of the first signal via the first antenna due to the electromagnetic coupling between the two antennas if signal power at the first frequency band is consumed by the second antenna feed line. To reduce this likelihood, a resonator is included as part of an N-plexer (e.g., a diplexer or a triplexer) that is disposed as part of the second antenna feed line. The resonator is tuned to reject signals corresponding to the first frequency band. The rejected signal power is reflected back to the second antenna, where it can be effectively utilized by the first antenna due to the electromagnetic coupling as part of a transmission or a reception operation. Rejecting the signal power increases an isolation between the two antenna feed lines with respect to the first frequency band and reduces the adverse signaling effects of the coupled antennas. Moreover, a smaller antenna can leverage a larger size of a bigger antenna to thereby "appear" larger from an electromagnetic signaling perspective. In these manners, the potentially deleterious impact of two or more antennas being electromagnetically coupled (e.g., non-galvanically coupled) together can be reduced. Consequently, additional antennas can be more tightly packed into a housing of an electronic device.

In an example aspect, an apparatus is disclosed. The apparatus includes a first antenna and a second antenna. The apparatus also includes a first receiver unit tuned to a first frequency band and a second receiver unit tuned to a second frequency band. The apparatus further includes a first antenna feed line and a second antenna feed line. The first antenna feed line is coupled between the first antenna and the first receiver unit. The second antenna feed line is coupled between the second antenna and the second receiver unit. The second antenna feed line comprises an N-plexer that includes a first path and a second path. The first path is coupled to the second antenna. The second path is coupled to the second receiver unit, with the second path including a resonator configured to cause the first frequency band to be substantially reflected.

In an example aspect, a system for N-plexer filtering for coupled antennas is disclosed. The system includes a first antenna and a second antenna. The system also includes a first receiver unit tuned to a first frequency band, a second receiver unit tuned to a second frequency band, and a third receiver unit tuned to a third frequency band. The system additionally includes a first antenna feed line coupled between the first antenna and the first receiver unit. The system further includes a second antenna feed line coupled between the second antenna and both the second receiver unit and the third receiver unit. The second antenna feed line comprises an N-plexer including first resonation means for rejecting the first frequency band.

In an example aspect, a method for N-plexer filtering for non-galvanically coupled antennas is disclosed. The method includes receiving a first portion of a signal via a first antenna and receiving a second portion of the signal via a second antenna. The method also includes propagating the first portion of the signal along a first antenna feed line corresponding to at least one first frequency band. The method further includes propagating the second portion of the signal along a second antenna feed line comprising an N-plexer including a first path and a second path. The propagating of the second portion includes routing the second portion along the first path to a node. The propagating of the second portion also includes routing the second portion from the node along the second path corresponding to a second frequency band, including reflecting a part of the second portion that corresponds to the first frequency band.

In an example aspect, an apparatus for N-plexer filtering for coupled antennas is disclosed. The apparatus includes an N-plexer having a first path, a second path, and a third path. The first path is coupled between a first port and a node. The second path is coupled between the node and a second port. The second path includes a resonator having a notch frequency response that attenuates a first frequency band and passes a second frequency band. The second path also includes a filter configured to pass signals within the second frequency band, with the filter including a filter passband that includes the second frequency band and the first frequency band. The third path is coupled between the node and a third port.

BRIEF DESCRIPTION OF DRAWINGS

FIGS. 5-1 and 5-2 illustrate example antenna feed lines with each having an N-plexer in which a resonator is not included and in which a resonator is included, respectively.

DETAILED DESCRIPTION

Figure 1:
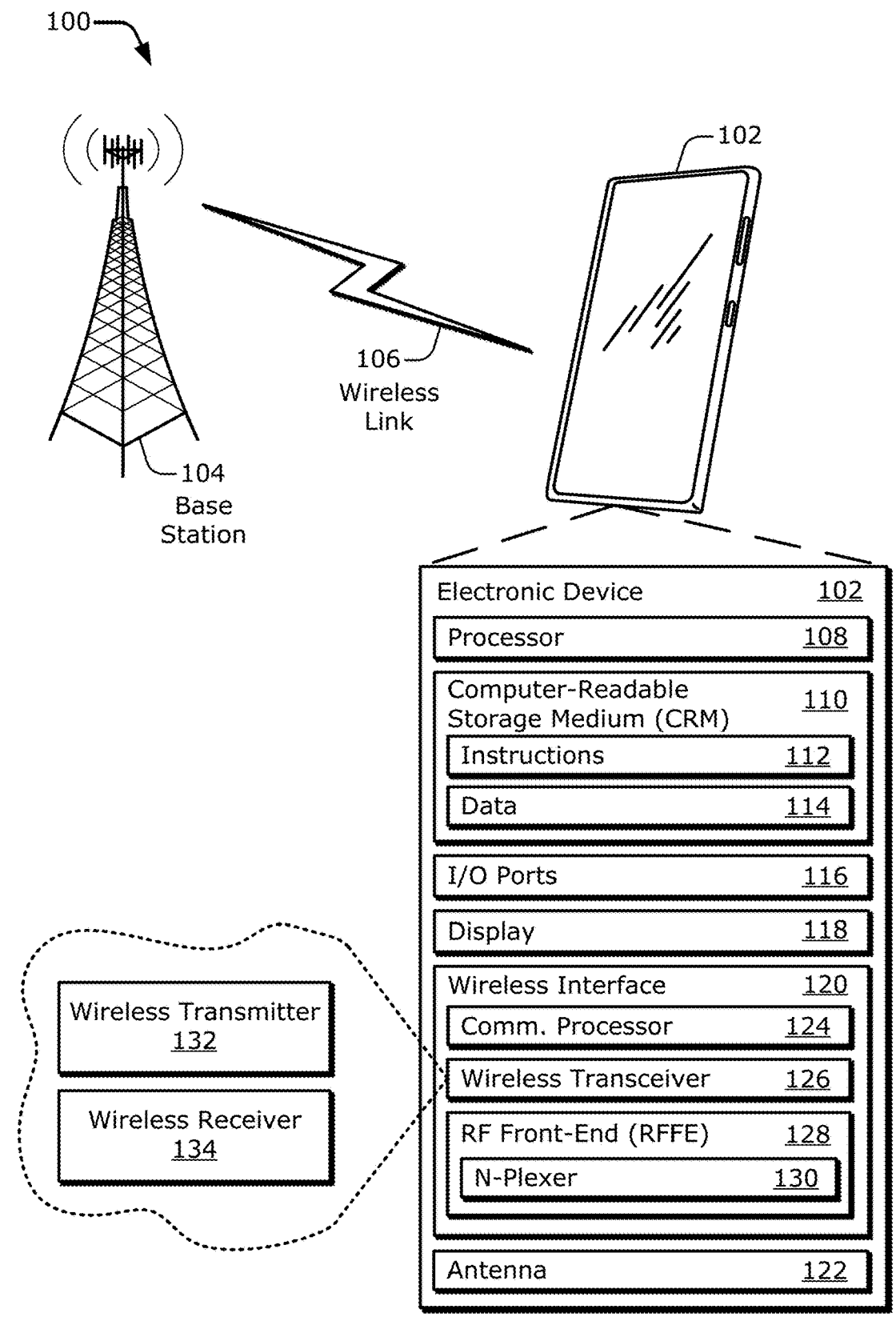
FIG. 1 illustrates an example environment that includes an electronic device having a radio-frequency (RF) front-end (RFFE) in which N-plexer filtering for coupled antennas can be implemented.

The wireless industry continues to provide new features and add to electronic devices the components that can support the new features. There are bigger screens and larger batteries to provide increased viewing areas and longer battery life. Also, the number of processors is increased to provide greater processing power or specialized compute engines. There are multiple cameras on multiple sides of devices to enable facial identification and enhanced photographic capabilities. Further, there are multiple radios and multiple antennas to support different wireless networks and directional signal transmission and reception. As a result, including all these various components within electronic devices, especially as some devices have become smaller, can be problematic. Engineers may have to forfeit providing some features or, alternatively, create techniques to enable components to fit into smaller spaces while continuing to correctly interoperate with each other.

With regard to antennas in particular, as electronic devices become smaller and/or as the number of included components increases, there is less room to pack a given quantity of antennas into the housing of each electronic device. Additionally, as the number of different types of wireless networks increases, a greater quantity of antennas is expected to be used within each given device housing. Examples of antenna types include multiple ones for cellular network access, at least one for using a Global Navigation Satellite System (GNSS), one or more for Wi-Fi networks, at least one for short-range Bluetooth® communication, and so forth. Further, antennas are often positioned around an exterior portion of a device housing to facilitate radio-frequency (RF) signal transmission and reception. With these factors together impacting antenna utilization, there is less space to accommodate all the desired antennas within a device housing. Consequently, two or more antennas may be positioned proximate to each other. Such proximity can result in the antennas being electromagnetically coupled, which can adversely affect the ability of the antennas to transmit or receive a signal. In such cases, if a first antenna is energized by or is radiating a wireless signal, a second antenna can be linked due to the antenna coupling. Signal power may therefore be deposited in an antenna feed line of the second antenna instead of being successfully received by or emanated from the first antenna. These signal-degrading effects may be intensified as a relative size difference between two or more antennas increases.

To counteract these signal-degrading effects, N-plexer filtering for coupled antennas is described herein. In some aspects, multiple antennas are electromagnetically coupled (e.g., non-galvanically coupled) together. Respective antennas of the multiple antennas are coupled to respective antenna feed lines of multiple antenna feed lines. Each antenna feed line is coupled to at least one transceiver unit of multiple transceiver units of a wireless transceiver. Each respective transceiver unit corresponds to a respective frequency band. In an example reception operation, a first antenna of the multiple antennas propagates a first portion of a signal along a first antenna feed line of the multiple antenna feed lines to a first transceiver unit that corresponds to a first frequency band. A second antenna of the multiple antennas propagates a second portion of the signal along a second antenna feed line of the multiple antenna feed lines to a second transceiver unit that corresponds to a second frequency band. The second antenna can, however, adversely impact the reception of the signal via the first antenna due to the electromagnetic coupling if signal power at the first frequency band is consumed by the second antenna feed line as the second portion of the signal propagates over the second antenna feed line. Analogous harmful effects can occur for signal transmission by the first antenna if signal power is deposited in the second antenna feed line from a signal being transmitted by the first antenna.

In some implementations, to reduce a likelihood that signal power is consumed in a second antenna feed line, a resonator is included as part of an N-plexer (e.g., a diplexer or a triplexer) that is disposed as part of the second antenna feed line. The resonator is tuned to reject signal power corresponding to the first frequency band. The rejected signal power is reflected back to the second antenna, where it can be utilized by the first antenna via the electromagnetic coupling as part of a transmission or reception operation. Rejecting the signal power increases the isolation between the two antenna feed lines with respect to the first frequency band and reduces adverse signaling affects. Moreover, especially if the second antenna is larger than the first antenna, the first antenna can leverage the greater size of the second antenna to "appear" larger from an electromagnetic-signaling perspective. In these manners, the potentially-deleterious impacts of two or more antennas being electromagnetically coupled can be reduced.

FIG. 1 illustrates an example environment 100 that includes an electronic device 102 having a radio-frequency front-end 128 (RF front-end 128 or RFFE 128) in which an N-plexer with filtering for coupled antennas can be implemented. In the environment 100, the example electronic device 102 communicates with a base station 104 through a wireless link 106. As shown, the electronic device 102 is depicted as a smart phone. However, the electronic device 102 may be implemented as any suitable computing or other electronic device, such as a cellular base station, broadband router, access point, cellular or mobile phone, gaming device, navigation device, media device, laptop computer, desktop computer, tablet computer, server computer, network-attached storage (NAS) device, smart appliance, vehicle-based communication system, Internet of Things (IoT) device, sensor or security device, asset tracker, medical device, fitness management device, wearable device such as intelligent glasses or smart watch, wireless power device (e.g., wireless power transmitter or receiver), and so forth.

The base station 104 communicates with the electronic device 102 via the wireless link 106, which may be implemented as any suitable type of wireless link. Although depicted as a base station tower of a cellular radio network, the base station 104 may represent or be implemented as another device, such as a satellite, terrestrial broadcast tower, access point, peer-to-peer device, mesh network node, fiber optic line, another electronic device as described above generally, and so forth. Hence, the electronic device 102 may communicate with the base station 104 or another device via a wired connection, a wireless connection, or a combination thereof.

The wireless link 106 extends between the electronic device 102 and the base station 104. The wireless link 106 can include a downlink of data or control information communicated from the base station 104 to the electronic device 102 and an uplink of other data or control information communicated from the electronic device 102 to the base station 104. The wireless link 106 may be implemented using any suitable communication protocol or standard, such as 3rd Generation Partnership Project Long-Term Evolution (3GPP LTE) (e.g., Fourth Generation (4G), 4G Long-Term Evolution (LTE), Fifth Generation (5G), or 5G New Radio (NR)), IEEE 802.11 (e.g., Wi-Fi), IEEE 802.16, Bluetooth™, and so forth.

As shown, the electronic device 102 includes a processor 108 and a computer-readable storage medium 110 (CRM 110). The processor 108 may include any type of processor, such as an application processor or a multi-core processor, that is configured to execute processor-executable instructions (e.g., code) stored by the CRM 110. The CRM 110 may include any suitable type of data storage media, such as volatile memory (e.g., random access memory (RAM)), non-volatile memory (e.g., Flash memory), optical media, magnetic media (e.g., disk or tape), and so forth. In the context of this disclosure, the CRM 110 is implemented to store instructions 112, data 114, and other information of the electronic device 102, and thus the CRM 110 does not include transitory propagating signals or carrier waves.

The electronic device 102 may also include input/output ports 116 (I/O ports 116) or a display 118. The I/O ports 116 enable data exchanges or interaction with other devices, networks, or users. The I/O ports 116 may include serial ports (e.g., universal serial bus (USB) ports), parallel ports, audio ports, infrared (IR) ports, camera or other sensor ports, and so forth. The display 118 can be realized as a screen or projection that presents graphics provided by the electronic device 102, such as a user interface associated with an operating system, program, or application. Alternatively or additionally, the display 118 may be implemented as a display port or virtual interface through which graphical content of the electronic device 102 is communicated or presented.

The electronic device 102 also includes at least one wireless interface 120 and at least one antenna 122. The wireless interface 120 provides connectivity to respective networks and peer devices via a wireless link, which may be configured similar to or differently from the wireless link 106. Alternatively or additionally, the electronic device 102 may include a wired interface, such as an Ethernet or fiber optic transceiver for communicating over a wired local network, an intranet, or the Internet. The wireless interface 120 may facilitate communication over any suitable type of wireless network, such as a wireless local area network (LAN) (WLAN), peer-to-peer (P2P) network, mesh network, cellular network, wireless wide-area-network (WWAN), a navigational network (e.g., the Global Positioning System (GPS) of North America or another Global Navigation Satellite System (GNSS)), and/or wireless personal-area-network (WPAN). In the context of the example environment 100, the electronic device 102 can communicate various data and control information bidirectionally with the base station 104 via the wireless interface 120. However, the electronic device 102 may additionally or alternatively use the wireless interface 120 to communicate directly with other peer devices, an alternative wireless network, and the like.

As shown, the wireless interface 120 includes at least one communication processor 124, at least one wireless transceiver 126, and at least one RFFE, which is illustrated as the RF front-end 128. These components process data information, control information, and signals associated with communicating information for the electronic device 102 via the antenna 122. The communication processor 124 may be implemented as a system-on-chip (SoC), a modem baseband processor, or a baseband radio processor (BBP) that enables a digital communication interface for data, voice, messaging, or other applications of the electronic device 102. The communication processor 124 can include a digital signal processor (DSP) or one or more signal-processing blocks (not shown) for encoding and modulating data for transmission and for demodulating and decoding received data. Additionally, the communication processor 124 may also manage (e.g., control or configure) aspects or operation of the wireless transceiver 126, the RF front-end 128, and other components of the wireless interface 120 to implement various communication protocols or communication techniques.

In example implementations, the wireless transceiver 126 can comprise at least one wireless transmitter 132, at least one wireless receiver 134, or both at least one wireless transmitter 132 and at least one wireless receiver 134. The wireless transceiver 126 includes circuitry and logic for filtering, amplification, channelization, and frequency translation. The frequency translation may include an up-conversion or a down-conversion of frequency that is performed in a single conversion operation, or through multiple conversion operations. The wireless transceiver 126 can include filters, switches, amplifiers, mixers, and so forth for routing and conditioning signals that are transmitted or received via the antenna 122. Although not explicitly shown, the wireless interface 120 can also include a digital-to-analog converter (DAC) or an analog-to-digital converter (ADC) to convert between analog signals and digital signals. The DAC and the ADC can be implemented as part of the communication processor 124, as part of the wireless transceiver 126, or separately from both of them.

The components or circuitry of the wireless transceiver 126 can be implemented in any suitable fashion, such as combined transceiver logic or separately as respective receiver and transmitter entities. In some cases, the wireless transceiver 126 is implemented with multiple or different sections to implement respective receiving and transmitting operations (e.g., with separate transmit and receive chains). The wireless transceiver 126 may also include logic to perform in-phase/quadrature (I/Q) operations, such as synthesis, phase correction, modulation, demodulation, and the like.

Generally, the RF front-end 128 includes one or more filters, switches, or amplifiers for conditioning signals received via the antenna 122 or signals to be transmitted via the antenna 122. As shown, the RF front-end 128 includes at least one N-plexer 130 to perform multiplexing of signals in the frequency domain. Examples of an N-plexer 130 include a diplexer, a triplexer, a quadplexer, and so forth. The RF front-end 128 may also include other RF sensors and components (not shown), such as a peak detector, power meter, gain control block, antenna tuning circuit, phase shifter, balun, and the like. Configurable components of the RF front-end 128, such as a phase shifter or gain control block, may be controlled by the communication processor 124 to implement communications in various modes or different frequency bands. As described herein, the N-plexer 130 can at least partially implement N-plexer filtering for coupled antennas.

Figure 2:
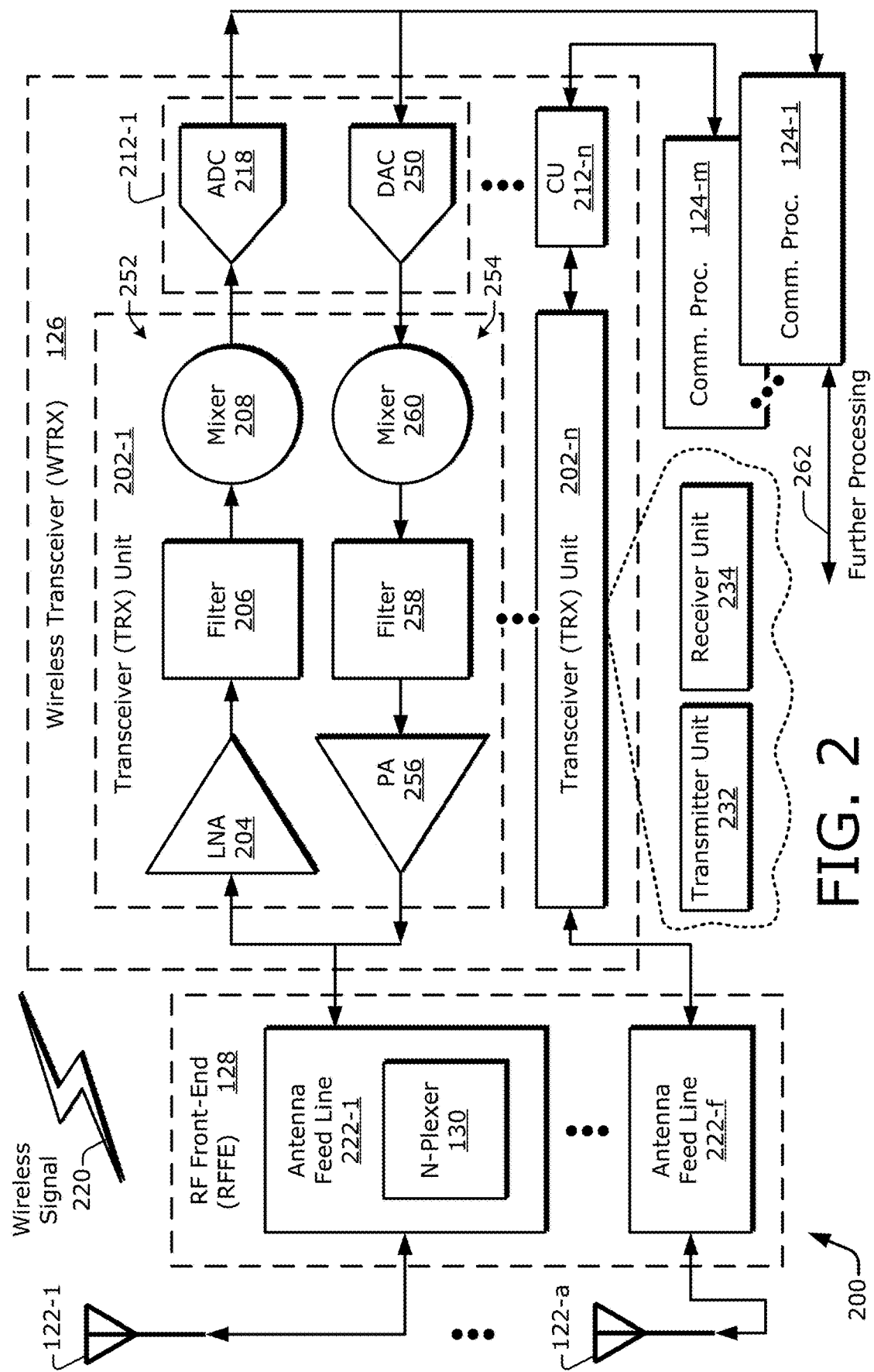
FIG. 2 illustrates an example RF front-end that is coupled between multiple antennas and a wireless transceiver such that N-plexer filtering for coupled antennas can be implemented.

FIG. 2 illustrates, at 200 generally, an example RF front-end 128 that is coupled between one or more antennas and a wireless transceiver 126 (WTRX 126) such that N-plexer filtering for coupled antennas can be implemented. The example RF front-end 128 includes at least one antenna feed line 222. As shown, the electronic device includes one or more antennas 122-1 . . . 122-$a$, with "a" representing a positive integer, and the RF front-end 128 includes one or more antenna feed lines 222-1 . . . 222-$f$, with "f" representing a positive integer. The integers "a" and "f" may be the same or different. From left to right, the multiple antennas 122-1 to 122-$a$ are coupled to the RF front-end 128, and the RF front-end 128 is coupled to the wireless transceiver 126. The wireless transceiver 126 is coupled to one or more of multiple communication processors 124-1 . . . 124-$m$, with "m" representing a positive integer. The wireless transceiver 126 includes one or more transceiver units 202-1 . . . 202-$n$, with "n" representing a positive integer. The integers "a," "f," "m," and "m" may be the same as one another or different from each another.

In some implementations, the RF front-end 128 couples the multiple antennas 122-1 to 122-$a$ to the at least one wireless transceiver 126 to enable a wireless signal 220 to be coupled from an antenna 122 to the wireless transceiver 126 as part of a reception operation. The RF front-end 128 also enables a wireless signal 220 to be coupled from the wireless transceiver 126 to an antenna 122 as part of a transmission operation. The RF front-end 128 includes the multiple antenna feed lines 222-1 to 222-*f* to couple each of the multiple antennas 122-1 to 122-*a* to at least one transceiver unit 202 of the wireless transceiver 126. Although not explicitly shown in FIG. 2, an RF front-end 128 may include one or more other components, such as a filter, an amplifier (e.g., a power amplifier or a low-noise amplifier), and so forth.

In operation, each antenna feed line 222 propagates a signal between an antenna 122 and a transceiver unit 202. During or as part of the propagation, the antenna feed line 222 conditions the propagating signal. The antenna feed line 222 can condition a signal using an N-plexer 130, a filter (not shown), an amplifier (not shown), and so forth. In the example explicitly depicted in FIG. 2, the first antenna feed line 222-1 is coupled between the first antenna 122-1 and the transceiver unit 202-1. Also, the fth antenna feed line 222-*f* is coupled between the ath antenna 122-*a* and the nth transceiver unit 202-*n*. The multiple antenna feed lines 222-1 to 222-*f* are described further below starting with FIG. 3. As shown with respect to the transceiver unit 202-*n*, in example implementations, a transceiver unit 202 can comprise at least one transmitter unit 232, at least one receiver unit 234, or both at least one transmitter unit 232 and at least one receiver unit 234. Thus, the wireless transmitter 132 (of FIG. 1) can include at least one transmitter unit 232, and the wireless receiver 134 (of FIG. 1) can include at least one receiver unit 234.

In FIG. 2 generally, multiple transceiver units 202-1 to 202-*n* are shown as part of the wireless transceiver 126. Each transceiver unit 202 of the multiple transceiver units 202-1 to 202-*n* is respectively coupled to an associated converter unit 212 (CU 212) of multiple converter units 212-1 to 212-*n*. Each converter unit 212, as depicted at the converter unit 212-1, can include an analog-to-digital converter 218 (ADC 218) and/or a digital to-analog converter 250 (DAC 250). As illustrated, the transceiver unit 202-1 is coupled to the communication processor 124-1 (e.g., via the converter unit 212-1), and the transceiver unit 202-*n* is coupled to the communication processor 124-*m* (e.g., via the converter unit 212-*n*). However, multiple transceiver units 202 can be coupled to a same communication processor 124. Although only certain components are explicitly depicted in FIG. 2 and are coupled together in a particular manner, the wireless transceiver 126 may include other non-illustrated components, more or fewer components, differently-coupled arrangements of components, and so forth. For example, the multiple converter units 212-1 to 212-*n* may be separate from the wireless transceiver 126, such as by being part of a communication processor 124. As a further example, another filter or another amplifier may be disposed along the receive chain between the first antenna 122-1 and the low-noise amplifier 204 such that a received wireless signal 220 is partially processed (e.g., filtered by the N-plexer 130 or another unillustrated component) prior to being routed to the low-noise amplifier 204.

The transceiver unit 202-1 includes a receiver 252 (or receive chain) that can at least partially realize a receiver unit 234 and a transmitter 254 (or transmit chain) that can at least partially realize a transmitter unit 232. The receiver 252 includes a low-noise amplifier 204 (LNA 204), a filter 206, and a mixer 208 for frequency down-conversion. The transmitter 254 includes a mixer 260 for up-conversion, a filter 258, and a power amplifier 256 (PA 256). However, the transceiver unit 202-1 can include other components—such as additional amplifiers or filters, multiple mixers, or at least one local oscillator—that are disposed anywhere along the depicted receive and transmit chains. The receiver 252 is coupled between the first antenna feed line 222-1 of the RF front-end 128 and the ADC 218, e.g., via the low-noise amplifier 204 and the mixer 208, respectively. The transmitter 254 is coupled between the first antenna feed line 222-1 of the RF front-end 128 and the DAC 250, e.g., via the power amplifier 256 and the mixer 260, respectively.

As shown for the receiver 252 of the transceiver unit 202-1, the first antenna 122-1 is coupled to the low-noise amplifier 204 via the first antenna feed line 222-1, and the low-noise amplifier 204 is coupled to the filter 206. The filter 206 is coupled to the mixer 208, and the mixer 208 is coupled to the ADC 218 for the receive chain. The ADC 218 is coupled to, or is part of, the communication processor 124-1. As shown for the transmit chain, the DAC 250 is coupled to, or is part of, the communication processor 124-1. The DAC 250 is also coupled to the transmitter 254 of the transceiver unit 202-1 via the mixer 260. The mixer 260 is coupled to the filter 258, and the filter 258 is coupled to the power amplifier 256. The power amplifier 256 is coupled to the first antenna 122-1 via the first antenna feed line 222-1. Similarly, the transceiver unit 202-*n* is coupled to the ath antenna 122-*a* via the fth antenna feed line 222-*f*. The transceiver unit 202-*n* is coupled to the converter unit 212-*n*, which is coupled to the communication processor 124-*m*. Although only one wireless transceiver 126 and one RF front-end 128 are shown, an electronic device 102 can include multiple instances of either or both components.

An example signal-receiving operation that includes the receiver 252 of the transceiver unit 202-1 is now described. As part of the signal-receiving operation, the first antenna 122-1 receives a wireless signal 220. The first antenna 122-1, like each antenna 122, can be implemented as an individual antenna, as an antenna array, as an antenna element of an antenna array, and so forth. The first antenna 122-1 provides the wireless signal 220 to at least one selected transceiver unit 202, which is the transceiver unit 202-1 here, via the first antenna feed line 222-1 of the RF front-end 128 using the N-plexer 130. Thus, the first antenna 122-1 provides the wireless signal 220 to the low-noise amplifier 204 of the transceiver unit 202-1 after conditioning or other signal manipulation by the first antenna feed line 222-1. The low-noise amplifier 204 amplifies the manipulated signal to produce an amplified signal. The low-noise amplifier 204 provides the amplified signal to the filter 206. The filter 206 filters (e.g., low-pass filters or bandpass filters) the amplified signal by attenuating some range or ranges of frequencies to produce a filtered signal that has one or more frequency bands attenuated. The filter 206 provides the filtered signal to the mixer 208.

The mixer 208 performs a frequency conversion operation on the filtered signal to down-convert from one frequency to a lower frequency, such as from a radio frequency (RF) to an intermediate frequency (IF) or a baseband frequency (BBF). The mixer 208 can perform the frequency down-conversion in a single conversion step, or through multiple conversion steps. Thus, the mixer 208 performs a frequency down-conversion operation on the filtered signal to produce a down-converted signal and provides the down-converted signal to the ADC 218. The ADC 218 converts the analog down-converted signal to a digital signal. The ADC 218 provides the digital signal to the communication processor 124-1. The communication processor 124-1 can perform demodulation, decoding, and so forth on the digital signal to produce a data signal. The communication processor 124-1 then provides the data signal to other components, such as a device processor, for further processing at 262 (e.g., for processing at an application level).

As part of an example signal-transmitting operation, the DAC 250 receives a digital signal from the communication processor 124-1. The DAC 250 converts the digital signal to an analog signal, which is at a baseband or intermediate frequency. The mixer 260 accepts the analog signal from the DAC 250 and upconverts the analog signal to a higher frequency, such as an RF frequency, to produce an RF signal. The mixer 260 provides the RF signal to the filter 258. The filter 258 filters the RF signal to attenuate one or more frequency ranges and produces a filtered signal, which is provided to the power amplifier 256. The power amplifier 256 amplifies the filtered signal to generate an amplified signal. The power amplifier 256 provides the amplified signal to the first antenna feed line 222-1 for signal conditioning. Using the N-plexer 130, the first antenna feed line 222-1 provides the conditioned signal to the first antenna 122-1 for emanation as the wireless signal 220.

Figure 3:
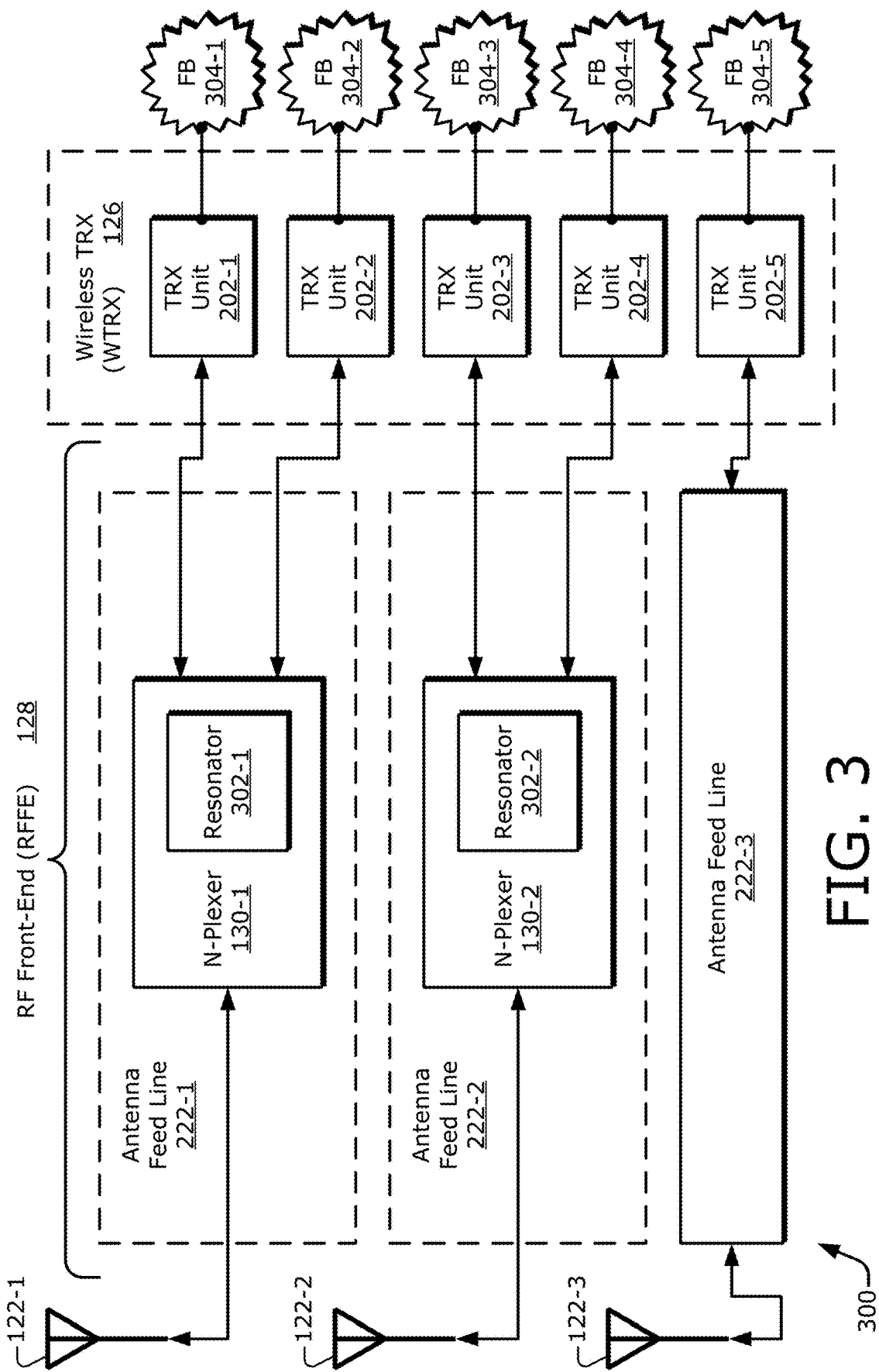
FIG. 3 illustrates an example RF front-end that includes multiple antenna feed lines, at least one of which includes an N-plexer, and an example wireless transceiver that includes multiple transceiver units.

FIG. 3 illustrates, generally at 300, an example RF front-end 128 that includes multiple antenna feed lines 222-1 to 222-3, at least one of which includes an N-plexer 130. FIG. 3 also illustrates multiple antenna feed lines 222-1 to 222-3 and an example wireless transceiver 126 that includes multiple transceiver units 202-1 to 202-5. Thus, as shown, the RF front-end 128 includes at least three antenna feed lines 222-1 to 222-3, and the wireless transceiver 126 includes at least five transceiver units 202-1 to 202-5. The three antennas 122-1 to 122-3 are depicted on the left. And on the right, five frequency bands 304-1 to 304-5 (FB 304) are depicted.

In some implementations, each respective antenna feed line 222 of the multiple antenna feed lines 222-1 to 222-3 is coupled to a respective antenna 122 of the multiple antennas 122-1 to 122-3. Thus, a first antenna 122-1 is coupled to a first antenna feed line 222-1, a second antenna 122-2 is coupled to a second antenna feed line 222-2, and a third antenna 122-3 is coupled to a third antenna feed line 222-3. At least one antenna feed line 222 includes an N-plexer 130, and at least one N-plexer 130 includes at least one resonator 302. Operation and functionality of a resonator 302 is described further below starting with FIG. 5. In the depicted example of FIG. 3, the first antenna feed line 222-1 includes a first N-plexer 130-1, which includes a first resonator 302-1. Similarly, the second antenna feed line 222-2 includes a second N-plexer 130-2, which includes a second resonator 302-2.

As indicated on the right of FIG. 3, each transceiver unit 202 respectively corresponds to a frequency band 304. Each transceiver unit 202 is therefore tuned to process signals having a frequency within the corresponding frequency band 304. Thus, each respective transceiver unit 202 of the multiple transceiver units 202-1 to 202-5 corresponds to, and is tuned to process signals within, a respective frequency band 304 of the multiple frequency bands 304-1 to 304-5. As shown, a first transceiver unit 202-1 corresponds to a first frequency band 304-1, a second transceiver unit 202-2 corresponds to a second frequency band 304-2, and a third transceiver unit 202-3 corresponds to a third frequency band 304-3. Further, a fourth transceiver unit 202-4 corresponds to a fourth frequency band 304-4, and a fifth transceiver unit 202-5 corresponds to a fifth frequency band 304-5.

Each antenna feed line 222 couples at least one antenna 122 to at least one transceiver unit 202. For example, the third antenna 122-3 is coupled to the fifth transceiver unit 202-5 via the third antenna feed line 222-3. However, the first and second antenna feed lines 222-1 and 222-2 are each coupled to two transceiver units using the first and second N-plexers 130-1 and 130-2, respectively. The first antenna feed line 222-1 is coupled between the first antenna 122-1 and both the first transceiver unit 202-1 and the second transceiver unit 202-2. The second antenna feed line 222-2 couples the second antenna 122-2 to both the third transceiver unit 202-3 and fourth transceiver unit 202-4. Thus, the second antenna feed line 222-2 can propagate signals between the second antenna 122-2 and the third transceiver unit 202-3 and/or between the second antenna 122-2 and the fourth transceiver unit 202-4 using the second N-plexer 130-2.

Specific quantities of some components (e.g., the antennas, the antenna feed lines, and the transceiver units) are shown in FIG. 3. However, an electronic device may be implemented with more or fewer such components. For example, a device may have a fourth antenna and a fourth antenna feed line, or the second N-plexer 130-2 may have two resonators. As used herein, a certain component may be identified by a number (e.g., "first," "second," or "third") to distinguish the component from like or similar components within a given context. However, this numbering terminology may differ from context to context or from implementation to implementation. For instance, a "first" resonator 302-1 may be included as part of a "second" N-plexer 130-2 of a "third" antenna feed line 222-2 in an alternative implementation.

Figure 4:
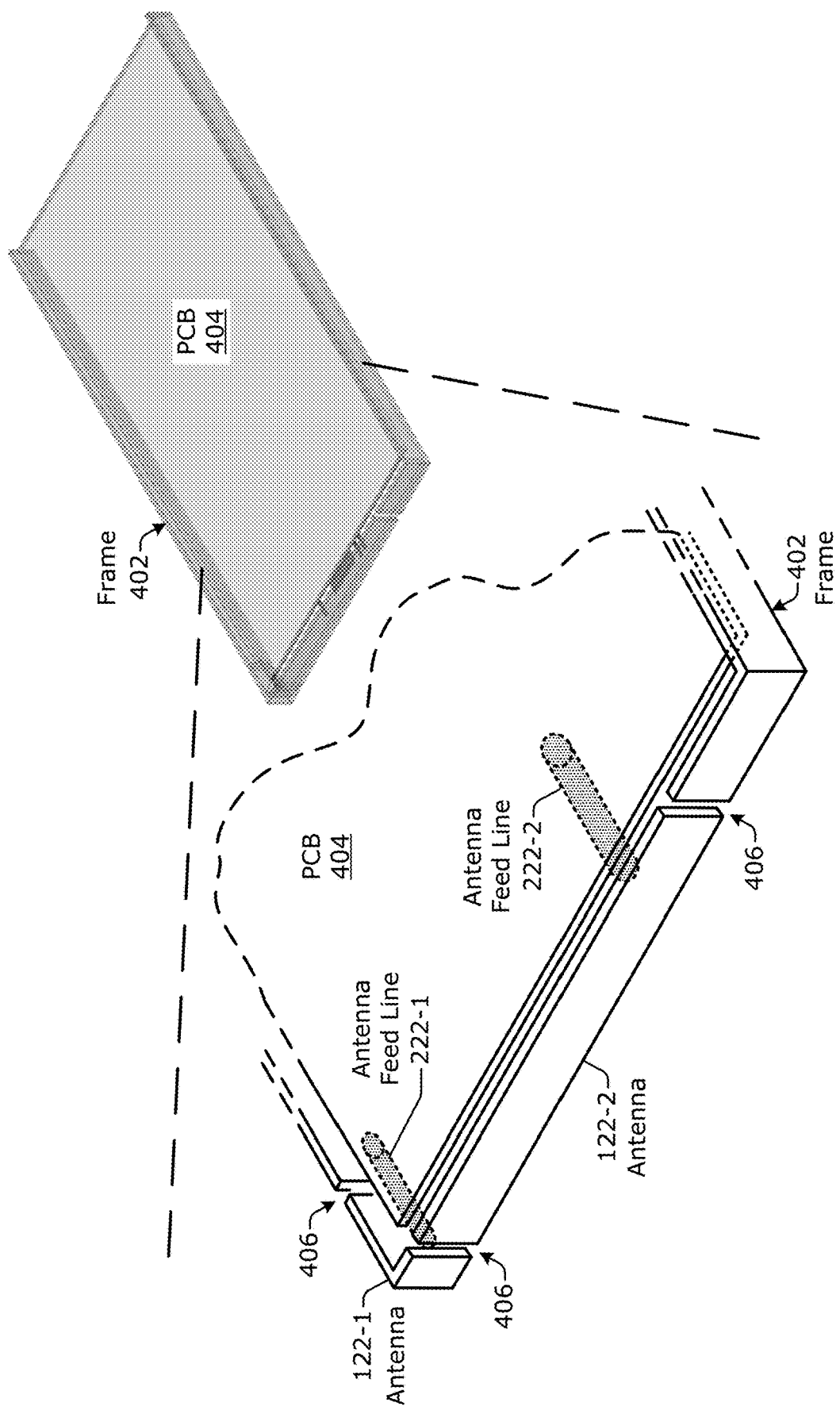
FIG. 4 illustrates an example housing of an electronic device including a frame that incorporates two antennas that are proximate to each other.

FIG. 4 illustrates an example housing 400 of an electronic device 102 (e.g., of FIG. 1). The housing 400 includes a frame 402 that incorporates two antennas that are proximate to each other. The frame 402 may be constructed from, e.g., metal. As depicted using an image at the upper right of FIG. 4, the frame 402 at least partially encloses a printed circuit board 404 (PCB 404). The printed circuit board 404 may be rigid or flexible and may be composed of any suitable material. An RF front-end 128 and a wireless transceiver 126 (e.g., of FIGS. 2 and 3) can be disposed on or mounted to the printed circuit board 404.

An enlarged schematic of a portion of the frame 402 and the printed circuit board 404 are illustrated at the lower left of FIG. 4. In some implementations, at least two antennas are formed from the frame 402. As shown, the frame 402 includes the first antenna 122-1 and the second antenna 122-2. In this example, the second antenna 122-2 is larger than the first antenna 122-1. Each of the two antennas are separated from each other and from other parts of the frame 402 by a gap 406 to enable the antennas to be independently energized by a wireless signal 220 during transmission or reception. Each respective antenna 122 is coupled to a respective antenna feed line 222, which is depicted as a tube to represent a mechanism for propagating a signal to and from the respective antenna 122. Specifically, the first antenna 122-1 is coupled to the first antenna feed line 222-1, and the second antenna 122-2 is coupled to the second antenna feed line 222-2.

In the illustrated example of FIG. 4, it is apparent that the first antenna 122-1 is positioned proximate to (e.g., adjacent to) the second antenna 122-2. Further, in this instance, the first and second antennas 122-1 and 122-2 are positioned sufficiently proximate to each other such that the first antenna 122-1 and the second antenna 122-2 are electromagnetically coupled. Thus, although the first antenna 122-1 and the second antenna 122-2 are not directly coupled together electrically these two antennas are coupled together from an electromagnetic perspective (e.g., via RF signals traveling through free space, an air medium, or the like), In other words, the first antenna 122-1 and the second antenna 122-2 can be galvanically isolated (e.g., separated electrically) but still be electromagnetically coupled. Consequently, if one antenna is energized by a radio frequency (RF) signal for transmission or reception, the other antenna can likewise be energized to some degree. An amount of a potential harmful effect from this electromagnetic coupling can be reduced by isolating the respective antenna feed lines using the techniques described herein. Although the first and second antennas 122-1 and 122-2 are shown as being part of the frame 402, the antennas can alternatively be separate from the frame, such as by being positioned inside or outside of the frame 402. Antennas can also take other shapes, be located in other areas of a the housing 400, and so forth.

The multiple frequency bands 304-1 to 304-5 (e.g., of FIG. 3) can correspond to any suitable frequency bands. These frequency bands may be mutually exclusive, may at least partially overlap, may be contained within one another, and so forth. Example frequency bands include one or more cellular frequency bands, one or more Wi-Fi frequency bands, one or more frequency bands for a Global Navigation Satellite System (GNSS), at least one WPAN frequency band, and so forth. Examples of related standards include 4G, 4G LTE and 4G LTE-Advanced, 5G, 5G NR, those of the 3GPP, IEEE 802.11, IEEE 802.16, Bluetooth®, the Global Positioning System (GPS) of North America, combinations thereof, and so forth. Frequencies can range, for example, from approximately 600 MHz to 300 GHz.

Figures 2, 5:
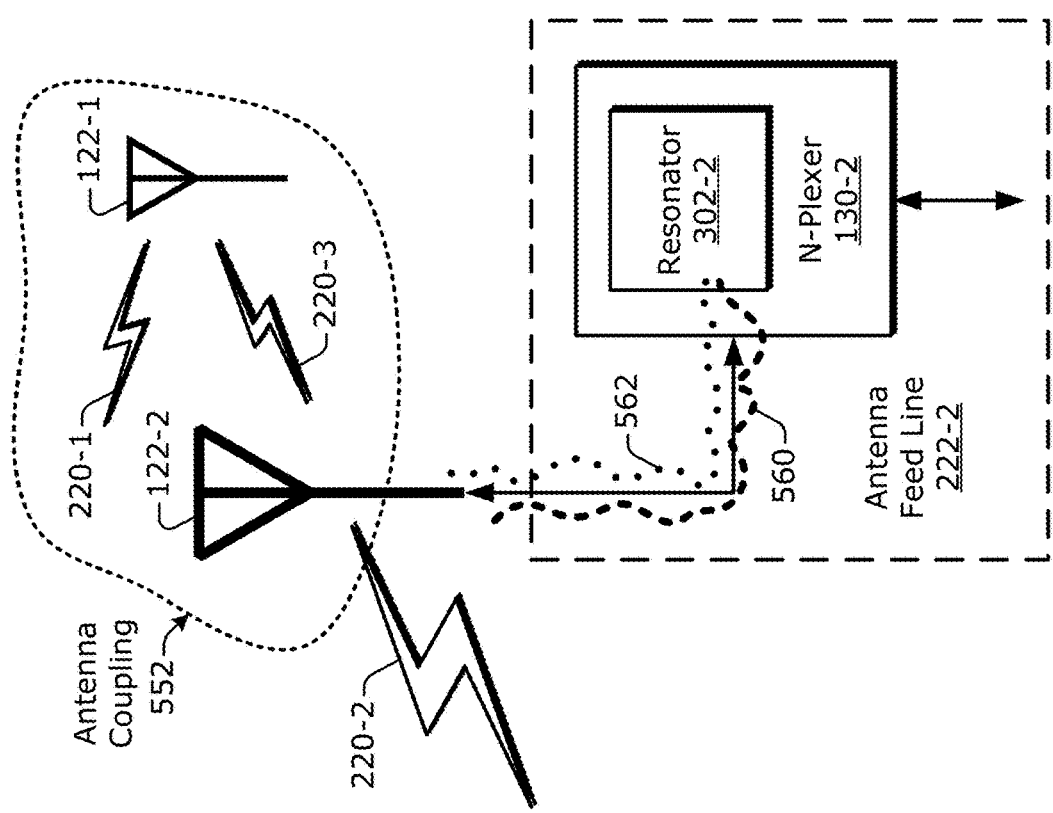
Figures 1, 5:
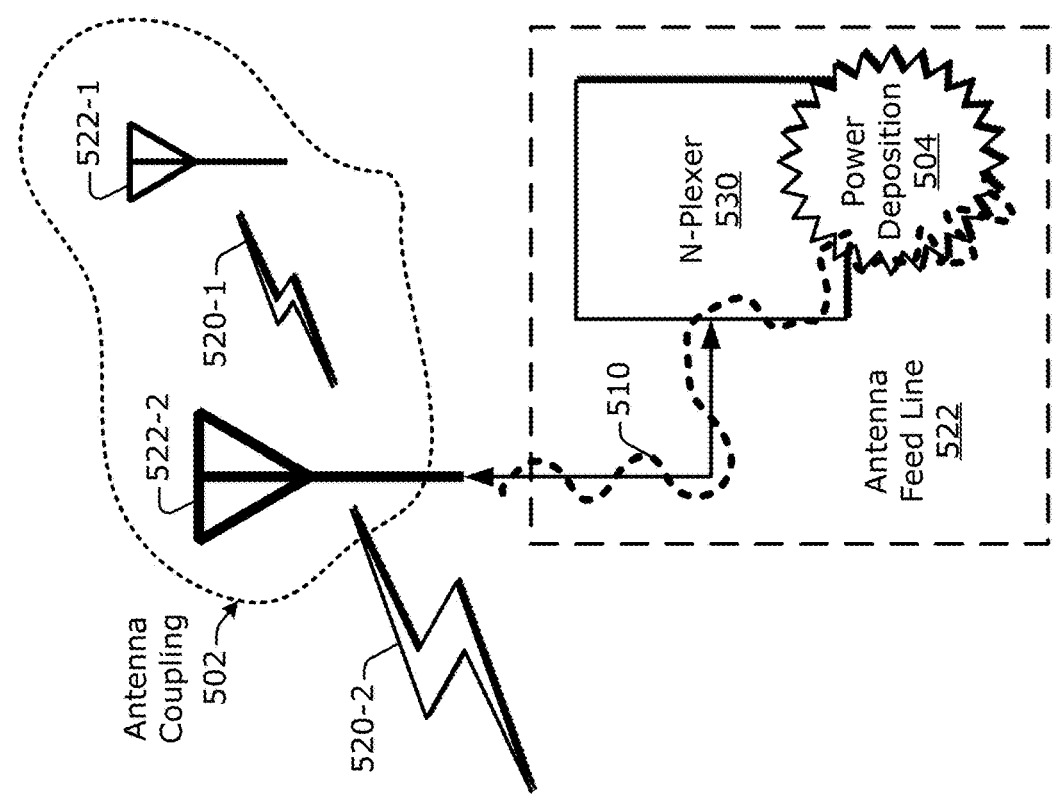
Figure 6:
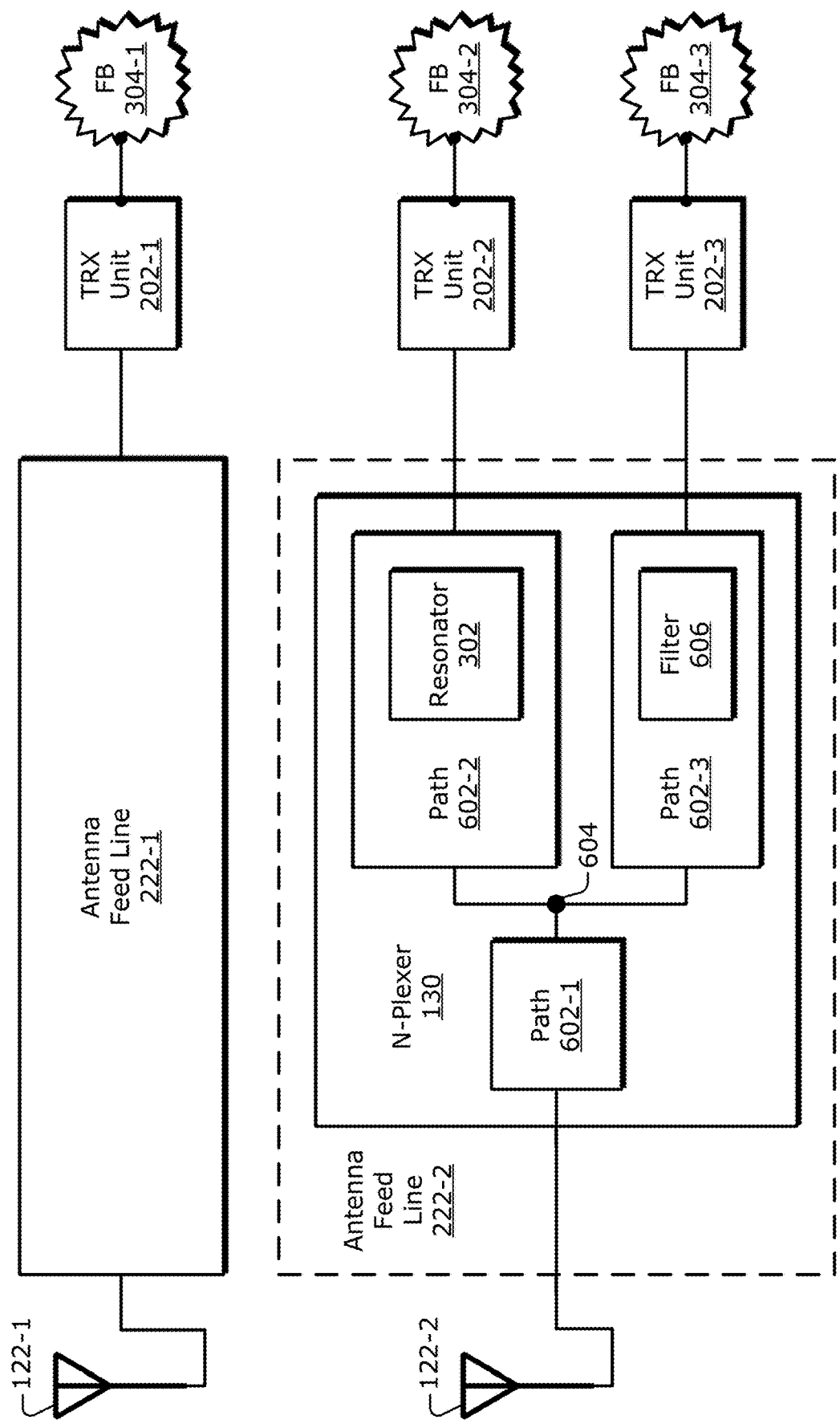
FIG. 6 is a schematic diagram that illustrates an example implementation of multiple antenna feed lines with an N-plexer having multiple paths for N-plexer filtering for coupled antennas.

FIGS. 5-1 and 5-2 respectively illustrate example antenna feed lines 522 and 222 having a respective N-plexer 530 and 130 in which a resonator is not included at 500-1 and in which a resonator 302 is included at 500-2. More specifically, as illustrated on the left at 500-1, an antenna feed line 522 includes an N-plexer 530 that does not include a resonator. On the other hand, on the right at 500-2, a second antenna feed line 222-2 includes a second N-plexer 130-2 that does include a second resonator 302-2 (e.g., as also shown in FIGS. 3 and 6). The antenna feed line 522 is discussed first, and the second antenna feed line 222-2 is described thereafter.

At 500-1, the antenna feed line 522 is electrically coupled to a second antenna 522-2. The second antenna 522-2 is electromagnetically coupled to a first antenna 522-1, which is indicated by antenna coupling 502. Here, the second antenna 522-2 is larger than the first antenna 522-1. In an example receiving operation, a wireless signal reaches an associated electronic device. The second antenna 522-2 receives a second portion 520-2 of the wireless signal and is energized by the second portion 520-2. The antenna feed line 522 propagates (e.g., as represented by the thick dashed line 510) the second portion 520-2 of the wireless signal over the N-plexer 530 toward a transceiver unit (not shown). In doing so, an appreciable part of the signal power of the second portion 520-2, and thus of the wireless signal generally, is deposited in the N-plexer 530. This can occur, for example, as signal current reaches a termination resistor of the N-plexer 530, which is represented by power deposition 504.

Consequently, due to the power deposition 504 by the second portion 520-2, an amount of power in a first portion 520-1 of the wireless signal that can energize the first antenna 522-1 is reduced. This likewise reduces an ability of the first antenna 522-1 to receive and correctly demodulate the wireless signal. The amount of reduction in received signal power can be exacerbated as a size differential between the first and second antennas 522-1 and 522-2 increases.

In contrast, at 500-2, the second N-plexer 130-2 of the second antenna feed line 222-2 includes a second resonator 302-2. The second antenna feed line 222-2 is electrically coupled to a second antenna 122-2. The second antenna 122-2 is electromagnetically coupled to a first antenna 122-1, which is indicated by antenna coupling 552. Here, the second antenna 122-2 is larger than the first antenna 122-1. In an example receiving operation, a wireless signal 220 (e.g., of FIG. 2) reaches an associated electronic device. The second antenna 122-2 receives a second portion 220-2 of the wireless signal 220 and is energized by the second portion 220-2. The first antenna 122-1 receives a first portion 220-1 of the wireless signal 220 and is energized by the first portion 220-1.

The second antenna feed line 222-2 propagates (e.g., as represented by the thick dashed line 560) the second portion 220-2 of the wireless signal 220 over the second N-plexer 130-2 toward a transceiver unit (e.g., a second or third transceiver unit 202-2 or 202-3 of FIG. 6). However, the second N-plexer 130-2 includes the second resonator 302-2. The second resonator 302-2 is configured to cause a rejection of signal power of signals within a first frequency band 304-1 (e.g., of FIG. 6) that corresponds to the first antenna 122-1. The second resonator 302-2 can be implemented to provide a notch frequency response that passes a second frequency band 304-2 and attenuates the first frequency band 304-1, with the second frequency band 304-2 corresponding to the second antenna 122-2 (or corresponding to a second transceiver unit 202-2 of FIG. 6). Thus, instead of signal power of the second portion 220-2 being consumed within the second N-plexer 130-2, an appreciable portion of this signal power is reflected toward the second antenna 122-2 and propagated back over the second antenna feed line 222-2 (e.g., as represented by the thick dotted line 562).

The reflected signal power of the second portion 220-2 returns to the second antenna 122-2. Due to the antenna coupling 552, this reflected signal power can be "shared" electromagnetically with the first antenna 122-1. As shown conceptually in FIG. 5, a part of the signal power of the second portion 220-2 of the wireless signal 220 can be received by the first antenna 122-1 as a third portion 220-3 after reflection caused by the second resonator 302-2. Accordingly, by employing the second resonator 302-2 to cause rejection of signals at frequencies that are to be transceived by the first antenna 122-1, adverse impacts of the antenna coupling 552 can be reduced.

Moreover, especially if, for instance, the second antenna 122-2 is appreciably larger than the first antenna 122-1, the second resonator 302-2 can leverage the larger size of the second antenna 122-2 to imbue the first antenna 122-1 with a larger effective size from an electromagnetic perspective. This can increase an ability of the first antenna 122-1 to be sensitive to signals being received. Further, because transmission and reception operations are reciprocal, the presence of the second resonator 302-2 can also increase an ability of the first antenna 122-1 to emanate RF signals by leveraging the second antenna 122-2. Various example implementations for employing a resonator 302 are described below starting with two example arrangements depicted in FIGS. 6 and 7.

FIG. 6 is a schematic diagram 600 that illustrates an example implementation of multiple antenna feed lines 222-1 to 222-2 with an N-plexer 130 having multiple paths 602-1 to 602-3 for N-plexer filtering for coupled antennas. As illustrated, schematic diagram 600 includes two antennas 122-1 to 122-2, two antenna feed lines 222-1 to 222-2, and three transceiver units 202-1 to 202-3. However, a different quantity of each may alternatively be present in other arrangements.

Thus, in some implementations, a given arrangement includes the first antenna 122-1 and the second antenna 122-2. The first transceiver unit 202-1 is tuned to a first frequency band 304-1. The second transceiver unit 202-2 is tuned to a second frequency band 304-2. The third transceiver unit 202-3 is tuned to a third frequency band 304-3. Also, the first antenna feed line 222-1 is coupled between the first antenna 122-1 and the first transceiver unit 202-1. The second antenna feed line 222-2 is coupled between the second antenna 122-2 and both the second transceiver unit 202-2 and the third transceiver unit 202-3. The second antenna feed line 222-2 includes an N-plexer 130.

Here, the N-plexer 130 is implemented as a diplexer, which provides two signal paths. Accordingly, the N-plexer 130 includes at least three physical paths 602-1 to 602-3. The first path 602-1 is coupled to the second antenna 122-2. The second path 602-2 is coupled to the second transceiver unit 202-2. The third path 602-3 is coupled to the third transceiver unit 202-3. Each of the first, second, and third paths 602-1, 602-2, and 602-3 is coupled to a "central" node 604 that enables a signal to be diplexed amongst the various physical paths. These three physical paths 602-1 to 602-3 are configured to provide two signal paths. For example, a first signal path—which is bidirectional—extends from the second antenna 122-2, over the first path 602-1, through the node 604, over the second path 602-2, and to the second transceiver unit 202-2. A second signal path—which is also bidirectional—extends from the second antenna 122-2, over the first path 602-1, through the node 604, over the third path 602-3, and to the third transceiver unit 202-3.

The second path 602-2 includes a resonator 302 configured to cause a rejection of signals of the first frequency band 304-1. Accordingly, a signal within the first frequency band 304-1 that is routed from (or to) the second antenna 122-2 along the second path 602-2 is affected by the resonator 302. For example, the signal within the first frequency band 304-1 can be reflected from the resonator 302, back to the node 604, over the first path 602-1, and to the second antenna 122-2 such that the second antenna 122-2 is energized. If the first and second antennas 122-1 and 122-2 are electromagnetically coupled, at least part of the signal power of the reflected signal can be transferred from the second antenna 122-2 to the first antenna 122-1. For a receiving operation, the reflected signal power can be propagated from the first antenna 122-1 along the first antenna feed line 222-1 and provided to the first transceiver unit 202-1 along with signal power that is "directly" received by the first antenna 122-1. The first transceiver unit 202-1, being tuned to handle signals within the first frequency band 304-1, can process the reflected signal portion in addition to a signal portion that was "directly" incident on the first antenna 122-1. For a transmitting operation, the reflected signal power can emanate away from the electronic device via the second antenna 122-2.

In accordance with an N-plexer implementation, at least the second and third paths 602-2 and 602-3 include at least one filter tuned for signals having a frequency within the second and third frequency bands 304-2 and 304-3, respectively. A filter 606 is explicitly depicted for the third path 602-3. The filter 606 is tuned for the third frequency band 304-3. Thus, the filter 606 attenuates signals outside of the third frequency band 304-3 but passes signals within the third frequency band 304-3. The attenuated signals therefore substantially fail to reach a termination resistor of the second path 602-3 and do not deposit an appreciable amount of power in the second path 602-3. In the depicted example, the first frequency band 304-1 is outside the third frequency band 304-3 and also does not substantially overlap a filter passband of the filter 606. Consequently, a resonator 302 can be omitted from the third path 602-3.

For the second path 602-2, the first frequency band 304-1 is substantially exclusive of, or outside of, the second frequency band 304-2. However, the first frequency band 304-1 is located at least partially within a filter passband of a filter (not explicitly shown) of the second path 602-2. As a result, signals within the first frequency band 304-1 may not be appreciably attenuated by the filter of the second path 602-2 and such signals may therefore deposit some amount of power in the second path 602-2—e.g., at a termination resistor thereof. To reduce this signal power consumption by the second path 602-2, the resonator 302 is included. The resonator 302 causes the signals to be rejected and reflected back to the second antenna 122-2 before the signals can reach a power-consuming component, such as a termination resistor. An example relationship between or among different frequencies of the signals and the frequency bands is described below with reference to FIG. 8. However, another example arrangement is described next with reference to FIG. 7.

Figure 7:
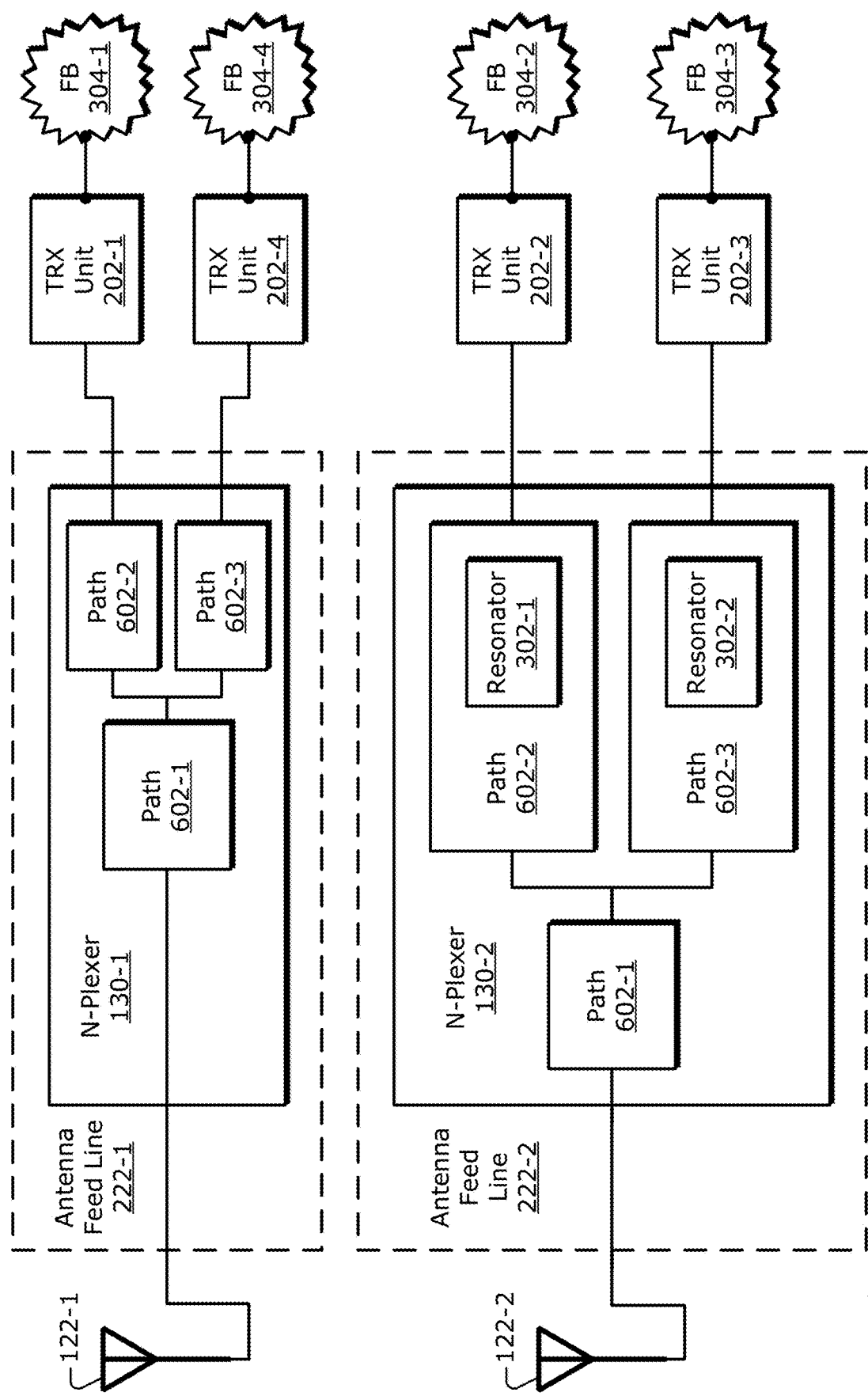
FIG. 7 is a schematic diagram that illustrates another example implementation of multiple antenna feed lines with multiple N-plexers having multiple paths for N-plexer filtering for coupled antennas.

FIG. 7 is a schematic diagram 700 that illustrates another example implementation of multiple antenna feed lines 222-1 to 222-2 with multiple N-plexers 130-1 to 130-2 having multiple paths 602-1 to 602-3 each for N-plexer filtering for coupled antennas. The schematic diagram 700 is similar to the schematic diagram 600 of FIG. 6. However, a fourth transceiver unit 202-4 is included that can result in a number of changes, which are described below. The fourth transceiver unit 202-4 is tuned for a fourth frequency band 304-4.

As shown, the first antenna feed line 222-1 couples the first antenna 122-1 to both the first transceiver unit 202-1 and the fourth transceiver unit 202-4. Accordingly, the first antenna feed line 222-1 includes a first N-plexer 130-1, which is realized as a diplexer here. The first N-plexer 130-1 includes first, second, and third paths 602-1, 602-2, and 602-3. The first path 602-1 is coupled to the first antenna 122-1; the second path 602-2 is coupled to the first transceiver unit 202-1; and the third path 602-3 is coupled to the fourth transceiver unit 202-4.

The second antenna feed line 222-2 is coupled between the second antenna 122-2 and both the second and third transceiver units 202-2 and 202-3. A second N-plexer 130-2 also includes three paths. For the second N-plexer 130-2: the first path 602-1 is coupled to the second antenna 122-2; the second path 602-2 is coupled to the second transceiver unit 202-2; and the third path 602-3 is coupled to the third transceiver unit 202-3. In contrast with FIG. 6, however, both paths includes a resonator 302. Specifically, the second path 602-2 includes a first resonator 302-1, and the third path 602-3 includes a second resonator 302-2. Example reasons for including dual resonators are described next.

In this example implementation, the first frequency band 304-1 is sufficiently close to the second frequency band 304-2 such that signals propagating along the second path 602-2 of the second N-plexer 130-2 may not be sufficiently attenuated by filter-related components that are targeted to pass and condition signals for the second frequency band 304-2. This situation is analogous to that of FIG. 6 and can be addressed by the inclusion of the first resonator 302-1 that is configured to cause rejection for the first frequency band 304-1. However, other frequency bands may also be impacted by electromagnetically coupled antennas in the schematic diagram 700 of FIG. 7.

For instance, the fourth frequency band 304-4 can be sufficiently close to the third frequency band 304-3 such that signals propagating along the third path 602-3 of the second N-plexer 130-2 may not be sufficiently attenuated by filter-related components that are targeted to pass and condition signals for the third frequency band 304-3. This can occur if, for example, the fourth frequency band 304-4 is exclusive of the frequencies of the third frequency band 304-3 but is at least partially overlapping with a filter passband of a filter (not shown in FIG. 7) that is included as part of the third path 602-3 of the second N-plexer 130-2 for the third transceiver unit 202-3. This is described below with reference to a graph depicted in FIG. 8. To address (e.g., ameliorate) the possibility that signal power for the fourth frequency band 304-4 is deposited in the third path 602-3 of the second N-plexer 130-2, a second resonator 302-2 is included in the third path 602-3. The second resonator 302-2 is configured to cause rejection of signal frequencies of the fourth frequency band 304-4.

In some implementations, a resonator 302 can be implemented as a notch filter or another filter that is configured to provide a notch frequency response that passes one frequency band and attenuates another frequency band that is surrounded by or that includes the one frequency band. Such a filter can be implemented as, for instance, a narrowband filter with relatively sharp (e.g., substantially vertical) skirts. A suitable filter can be realized using, for example, an acoustic wave device (AWD). Acoustic wave devices include a surface acoustic wave (SAW) device, a bulk acoustic wave (BAW) device, combinations thereof, and so forth. Acoustic wave devices have properties that can enable one to be included along a path 602 of an N-plexer 130 without appreciable adverse effects on other components that are disposed along the path 602 and/or an intended filtering of such other components. These properties and other components are described below with reference to the example circuit diagrams of FIGS. 9 and 10.

Figure 8:
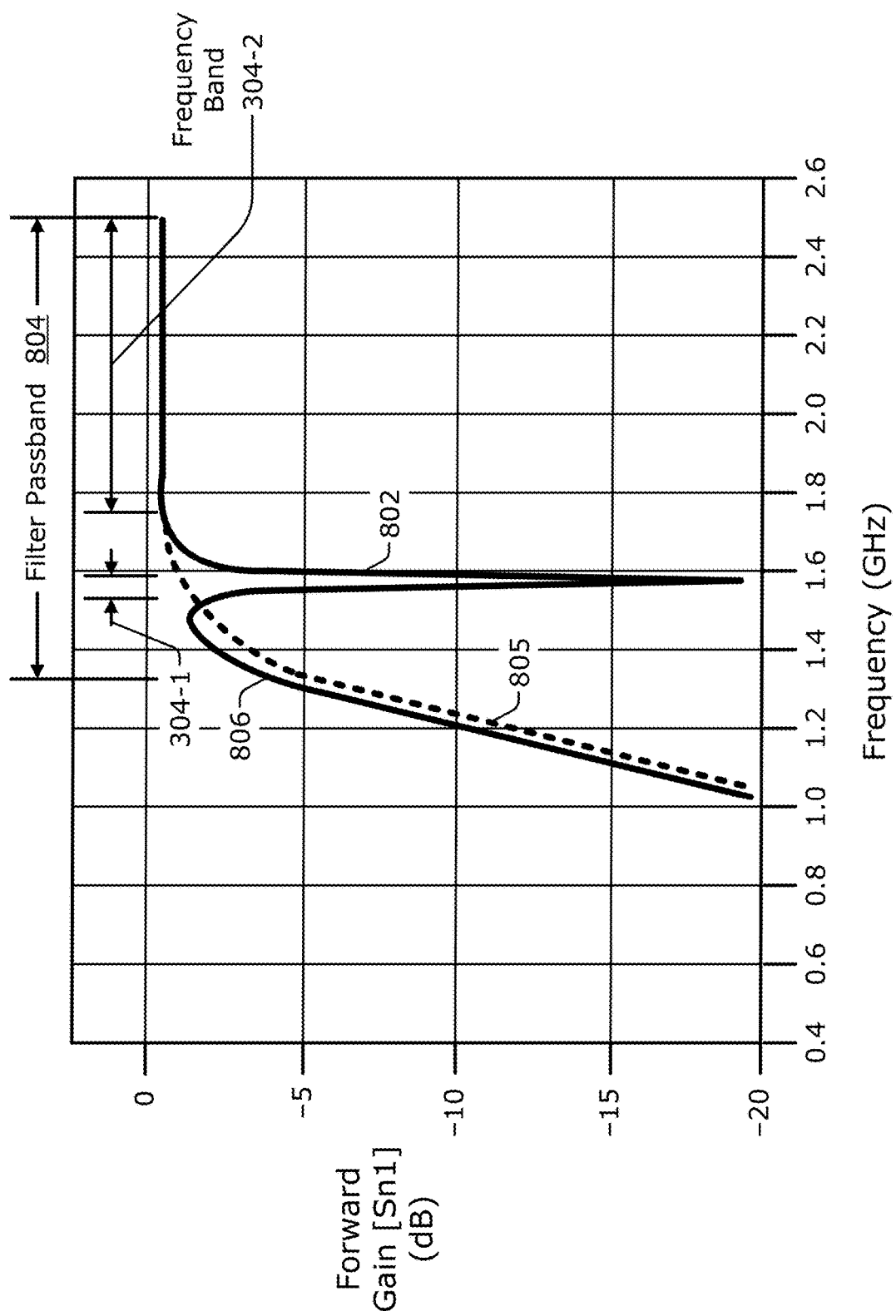
FIG. 8 depicts a graph that illustrates an example forward gain of a path of an N-plexer without a resonator and with a resonator.

FIG. 8 depicts a graph 800 that illustrates an example forward gain of a path 602 of an N-plexer 130 without a resonator and with a resonator 302. The graph 800 depicts a forward gain [Sn1] in decibels (dB) along an ordinate or vertical axis versus frequency in gigahertz (GHz) along an abscissa or horizontal axis. The depicted portion of the forward gain extends from 0 to −20 dB, and the depicted portion of the frequency extends from 0.4 to 2.6 GHz. The forward gain [Sn1] can correspond to an amount of power of a signal that exits a path 602 of an N-plexer 130 relative to an amount of power of the signal that entered the path 602.

Two example gain responses are graphed. A gain response 805 (with a thick dashed line) corresponds to a forward gain of a path 602 without a resonator. A gain response 806 (with a thick dashed line) corresponds to a forward gain of a path 602 with a resonator 302. These two gain responses are similar. However, the gain response 806 includes a notch 802 that corresponds to the frequencies that the resonator 302 causes to be rejected. The in-band frequency range of interest for a given path 602 and the corresponding transceiver unit 202 is represented by a frequency band 304, such as the second frequency band 304-2 (e.g., also of FIG. 6). A range of frequencies passed by a filter included in the given path 602 is represented by a filter passband 804.

As indicated by the graph 800, the filter passband 804 exceeds the second frequency band 304-2 to ensure that frequencies of interest are not excluded from being passed by the filter. Consequently, a first frequency band 304-1 (e.g., also of FIG. 6) that is exclusive of a second frequency band 304-2, but is proximate thereto, may be passed by the filter. This enables signal power corresponding to the first frequency band 304-1 to be deposited in the path 602 due to power consumption at, e.g., a terminal resistor. To counteract this possibility, a resonator 302 with a relatively narrow rejection band is deployed in the path 602 to generate the notch 802.

With reference to FIGS. 7 and 8, in an example scenario, a second frequency band 304-2 can correspond to a mid-to-high frequency cellular band (MHB), and a third frequency band 304-3 can correspond to a low frequency cellular band (LB). A first frequency band 304-1 can correspond to an L1 GPS band (e.g., 1575 MHz), and a fourth frequency band 304-4 can correspond to an L5 GPS band (e.g., 1176 MHz). In this scenario, the first resonator 302-1 is configured to cause rejection of the L1 GPS band, and the second resonator 302-2 is configured to cause rejection of the L5 GPS band. For this scenario, the gain response 806 depicted in FIG. 8 represents an example frequency response for the second path 602-2 of the second N-plexer 130-2 with the first resonator 302-1 configured to reject frequencies of the L1 GPS band at 1575 MHz.

Figure 9:
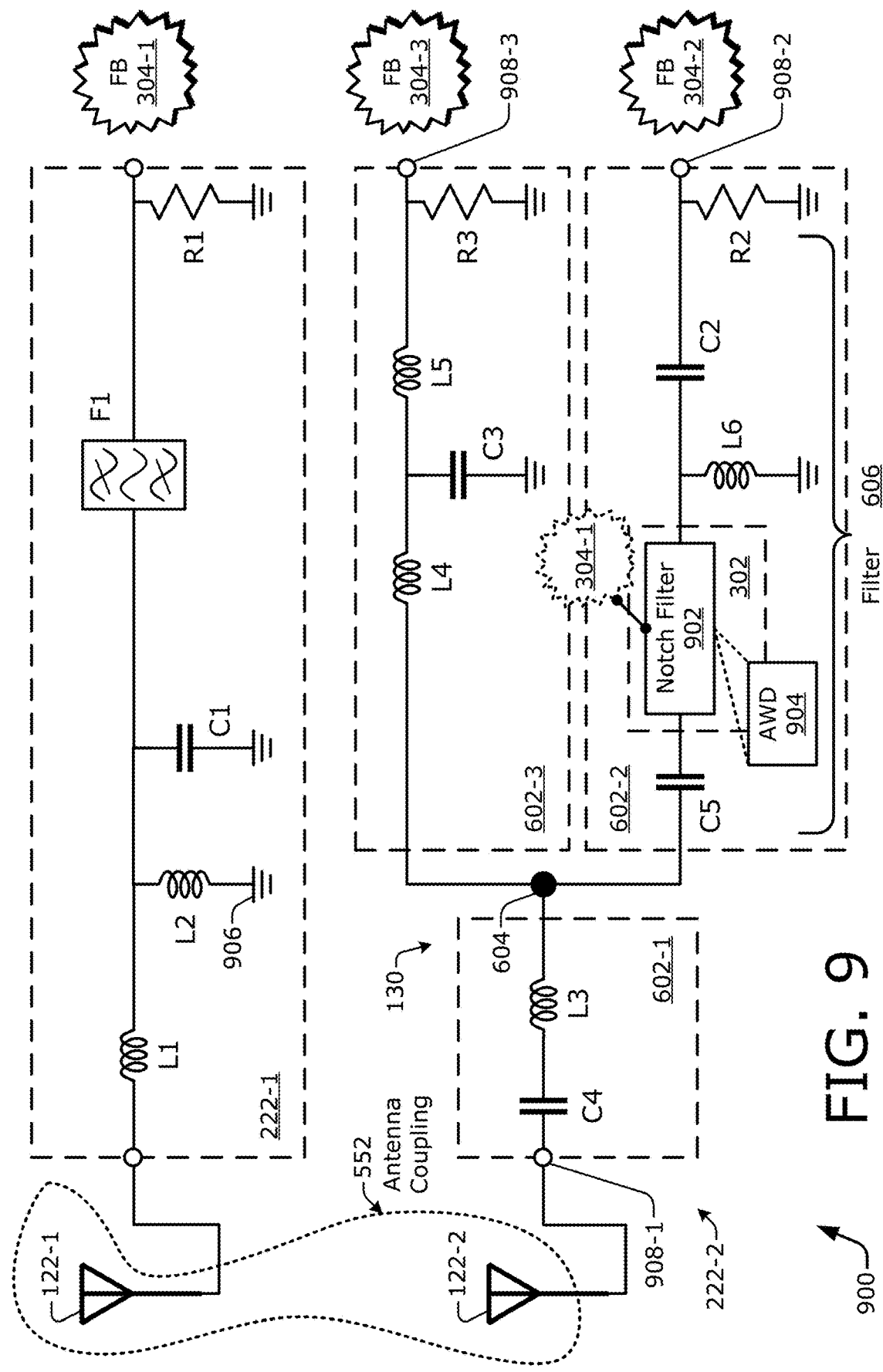
FIG. 9 is a circuit diagram that illustrates an example implementation of multiple antenna feed lines with an N-plexer having multiple paths for N-plexer filtering for coupled antennas.

FIG. 9 is a circuit diagram 900 that illustrates an example implementation of multiple antenna feed lines 222-1 to 222-2 with an N-plexer 130 having multiple paths 602-1 to 602-3 for N-plexer filtering for coupled antennas. The circuit diagram 900 includes multiple circuit components and depicts an example circuit implementation of the schematic diagram 600 of FIG. 6. Although certain circuit components are arranged in particular manners as shown in FIG. 9 and described below, fewer circuit components, more circuit components, or different circuit components may be included, and/or the included circuit components can be arranged in different manners.

Each N-plexer 130 may include multiple ports, such as one port 908 per path 602. In FIG. 9, the N-plexer 130, which is implemented as an example diplexer, therefore includes three ports 908-1, 908-2, and 908-3. The first path 602-1 is coupled between a first port 908-1 and the node 604. The second path 602-2 is coupled between the node 604 and a second port 908-2. The third path 602-3 is coupled between the node 604 and a third port 908-3. In operation, the N-plexer 130 provides a first signal path between the first port 908-1 and the second port 908-2 using the first path 602-1 and the second path 602-2. The N-plexer 130 also provides a second signal path between the first port 908-1 and the third port 908-3 using the first path 602-1 and the third path 602-3. In such cases, the first port 908-1 functions as a shared port 908. Each signal path may be bidirectional.

As shown, the first antenna feed line 222-1 includes an inductor L1, an inductor L2, a capacitor C1, a bandpass filter F1, and a first termination resistor R1. The first antenna feed line 222-1 can be coupled to the first transceiver unit 202-1 (e.g., of FIG. 6) via the first termination resistor R1. The inductor L1 and the bandpass filter F1 are coupled in series along a wireline of the first antenna feed line 222-1 between the first antenna 122-1 and the first transceiver unit 202-1. The inductor L2 and the capacitor C1 are coupled along the first antenna feed line 222-1 between the wireline thereof and a ground 906. The first termination resistor R1 is coupled between the wireline and the ground 906. The different termination resistors Rx can provide a desired terminal impedance, such as 50 ohms. to facilitate impedance matching with a respective transceiver unit 202-x.

For the second antenna feed line 222-2, the first path 602-1 of the N-plexer 130 includes a capacitor C4 and an inductor L3 coupled in series together between the second antenna 122-2 and the node 604. The third path 602-3 includes an inductor L4, an inductor L5, a capacitor C3, and a third termination resistor R3. The inductor L4 and the inductor L5 are coupled together in series along a wireline of the third path 602-3 between the node 604 and the third transceiver unit 202-3 (e.g., of FIG. 6). The capacitor C3 is coupled between the wireline of the third path 602-3 and the ground 906 at a location along the wireline that is between the inductors L4 and L5. The third termination resistor R3 is coupled between the wireline and the ground 906. At least a portion of the circuit components of the third path 602-3 form at least part of a filter (not separately indicated in FIG. 9) that is tuned to pass signals within the third frequency band 304-3.

The second path 602-2 of the N-plexer 130 includes a capacitor C5, a capacitor C2, an inductor L6, a resonator 302, and a second termination resistor R2. The capacitor C5, the resonator 302, and the capacitor C2 are coupled together in series along a wireline of the second path 602-2 between the node 604 and the second transceiver unit 202-2 (e.g., of FIG. 6). The inductor L6 is coupled between the wireline of the third path 602-3 and the ground 906 at a location between the resonator 302 and the capacitor C2. The second termination resistor R2 is coupled between the wireline of the second path 602-2 and the ground 906. At least a portion of the circuit components of the second path 602-2 (e.g., at least the capacitors C5 and C2 and the inductor L6) form at least part of the filter 606, which is tuned to pass signals within the second frequency band 304-2.

However, the filter 606 may, without including the resonator 302, permit frequencies within the first frequency band 304-1 to be passed to the second termination resistor R2, which consumes power as current flows through the resistance to the ground 906. To substantially reduce this current flow for signals at the first frequency band 304-1, the resonator 302 is disposed in series with the capacitors C5 and C2 along the wireline. The resonator 302 is configured to cause a rejection of signals of the first frequency band 304-1, as indicated by the starburst shape formed with dashed lines. More specifically, the resonator 302 may be configured to reject signals within the first frequency band 304-1 and reflect the associated signal power back to the second antenna 122-2 via the node 604 and the first path 602-1.

In some implementations, the resonator 302 can be implemented as a notch filter 902, a band reject filter, a filter configured to provide a notch frequency response that passes the second frequency band 304-2 and attenuates the first frequency band 304-1, some combination thereof, and so forth. The notch filter 902 can be used if, for instance, the first frequency band 304-1 is sufficiently narrowband to be covered by a notch frequency response. An example of a type of filter that can realize a notch frequency response is an acoustic wave device 904 (AWD 904). Acoustic wave devices 904 can include bulk acoustic wave (BAW) filters, surface acoustic wave (SAW) filters, and so forth. An acoustic wave device 904 can be configured to have a narrowband. For the frequency band to which the acoustic wave device 904 is designed, the acoustic wave device 904 appears as an open circuit. Consequently, signal power that is incident on the acoustic wave device 904 at the designed frequencies (e.g., those of the first frequency band 304-1) is reflected back toward the second antenna 122-2.

Generally, SAW, BAW, and other acoustic resonators can be configured to operate as an open circuit or a short circuit in a targeted frequency band while operating in a capacitive manner out-of-band. Accordingly, an acoustic resonator can be incorporated into a device (e.g., a filter branch) that is already capacitive via substitution or otherwise by accounting for capacitive changes—and therefore not necessarily by accommodating a completely-new capacitive response. In this sense, an acoustic filter can be integrated into a filter branch without changing a basic performance of the filter branch (e.g., without degrading insertion loss). For integration in a series circuit configuration, an acoustic resonator can be configured to function like an open circuit at a rejection frequency band, as discussed above for the notch filter 902 of FIG. 9 and below for a first notch filter 902-1 of FIG. 10. In contrast, for integration in a shunt circuit configuration, an acoustic resonator can be configured to function like a short circuit at a rejection frequency band, as discussed below for a second notch filter 902-2 of FIG. 10. In both cases, a reflective impedance can be achieved with an acoustic resonator.

For signals that are outside the notched frequency band, the acoustic wave device 904 functions capacitively, or appears as a capacitive component with a determinable capacitance. Accordingly, the second path 602-2 can be configured to have a desired capacitance to the left of the inductor L6 for frequencies of the second frequency band 304-2 by considering a resulting series-capacitance produced by the capacitor C5 and the capacitance of the acoustic wave device 904 along the wireline of the second path 602-2. In these manners, a resonator 302 that is implemented using an acoustic wave device 904 can be configured to function as an open circuit in one frequency band and to function capacitively in another frequency band.

Figure 10:
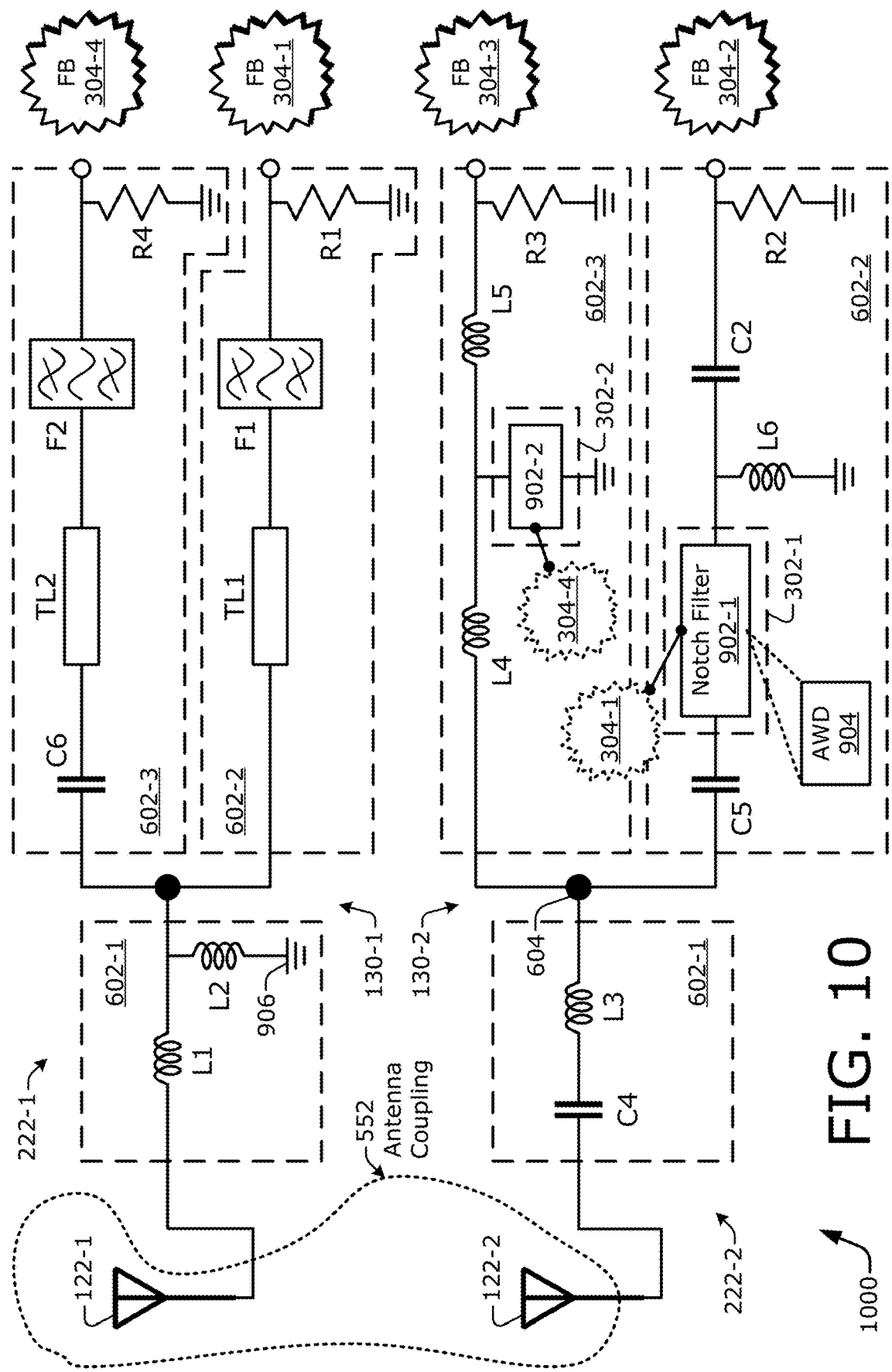
FIG. 10 is a circuit diagram that illustrates another example implementation of multiple antenna feed lines with multiple N-plexers having multiple paths for N-plexer filtering for coupled antennas.

FIG. 10 is a circuit diagram 1000 that illustrates another example implementation of multiple antenna feed lines 222-1 to 222-2 with multiple N-plexers 130-1 to 130-2 each having multiple paths 602-1 to 602-3 for N-plexer filtering for coupled antennas. The circuit diagram 1000 includes multiple circuit components and depicts an example circuit implementation of the schematic diagram 700 of FIG. 7. Although certain circuit components are arranged in particular manners as shown in FIG. 10 and described below, fewer circuit components, more circuit components, or different circuit components may be included, and/or the included circuit components can be arranged in different manners.

As shown, to accommodate an additional transceiver unit 202 (e.g., the transceiver unit 202-4 of FIG. 7 corresponding to the fourth frequency band 304-4), the first antenna feed line 222-1 includes a first N-plexer 130-1 with three paths. The first path 602-1 of the first N-plexer 130-1 includes an inductor L1 and an inductor L2. The second path 602-2 includes a transmission line TL1, a bandpass filter F1, and a termination resistor R1. The third path 602-3 includes a capacitor C6, a transmission line TL2, a bandpass filter F2, and a termination resistor R4. Here, two circuit components (the transmission lines TL1 and TL2) of the first antenna feed line 222-1 are implemented as distributed element components. However, lumped-element components can be used for these two circuit components, and/or distributed element components can be used for other circuit components.

For the second antenna feed line 222-2, the second N-plexer 130-2 include three paths. The first path 602-1 includes a capacitor C4 and an inductor L3, like the first path 602-1 of the N-plexer 130 of FIG. 9. The second path 602-2 of the second N-plexer 130-2 includes a capacitor C5, a capacitor C2, an inductor L6, and a second termination resistor R2, like the second path 602-2 of the N-plexer 130 of FIG. 9. Further, the second path 602-2 of the second antenna feed line 222-2 of FIG. 10 includes a first resonator 302-1, which is configured to cause a rejection of the first frequency band 304-1, as indicated by the dashed-line starburst shape. The first resonator 302-1 is coupled in series along a wireline of the second path 602-2 and can be implemented with a first notch filter 902-1 or the like. In this series circuit configuration, the first notch filter 902-1 is configured to present an open circuit response for frequencies corresponding to the first frequency band 304-1 (e.g., the rejection frequency band) and to present a capacitive response for out-of-band frequencies.

The third path 602-3 of the second N-plexer 130-2, however, differs from the third path 602-3 of FIG. 9 to account for the fourth transceiver unit 202-4 (of FIG. 7) that is coupled to the fourth termination resistor R4 of the third path 602-3 of the first N-plexer 130-1. Specifically, the capacitor C3 of the third path 602-3 of the N-plexer 130 of FIG. 9 is replaced by a second resonator 302-2 in the third path 602-3 of the second N-plexer 130-2 of FIG. 10. As illustrated, the second resonator 302-2 is coupled between a wireline of the third path 602-3 and the ground 906 to create a frequency-dependent shunt path. The second resonator 302-2 is configured to reject signals within the fourth frequency band 304-4 and reflect the associated signal power back to the second antenna 122-2 via the node 604 and the first path 602-1 of the second N-plexer 130-2. In some implementations, the second resonator 302-2 can be implemented as a second notch filter 902-2, or band reject filter. A notch filter can be used if, for instance, the fourth frequency band 304-4 is sufficiently narrowband to be covered by a filter with a notch frequency response that passes the third frequency band 304-3 and attenuates the fourth frequency band 304-4. Thus, in this shunt circuit configuration, the second notch filter 902-2 is configured to present a short circuit response for frequencies corresponding to the fourth frequency band 304-4 (e.g., the rejection frequency band) and to present a capacitive response for out-of-band frequencies. An example of a type of filter that can realize a notch filter is an acoustic wave device (AWD). Example properties of a BAW or SAW filter are set forth above with reference to the acoustic wave device 904 as described for FIG. 9.

Figure 11:
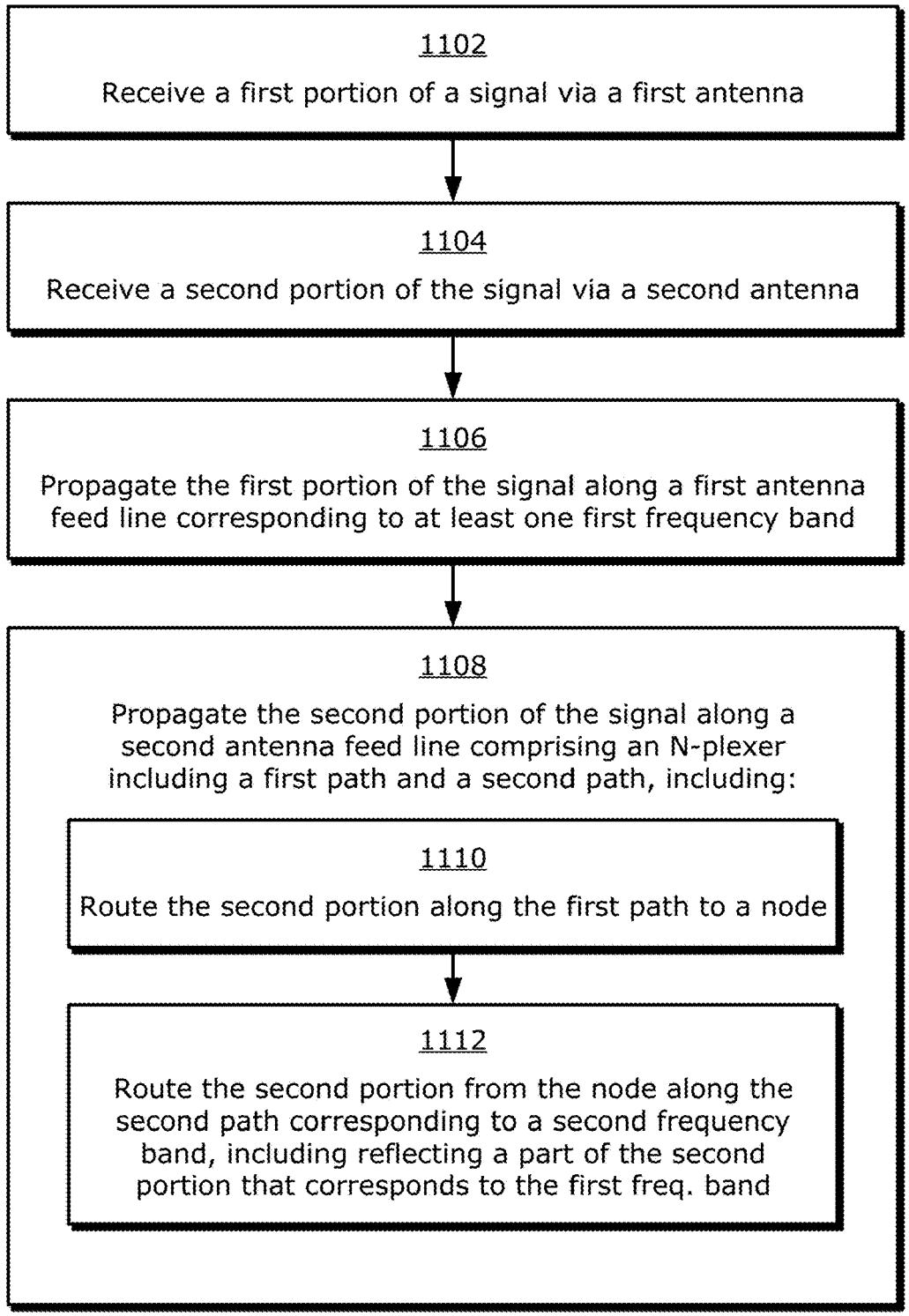
FIG. 11 is a flow diagram illustrating an example process for N-plexer filtering for coupled antennas.

FIG. 11 is a flow diagram illustrating an example process 1100 for N-plexer filtering for coupled antennas. The process 1100 is described in the form of a set of blocks 1102-1112 that specify operations that can be performed. However, operations are not necessarily limited to the order shown in FIG. 11 or described herein, for the operations may be implemented in alternative orders or in fully or partially overlapping manners. Also, fewer, more, and/or different operations may be implemented to perform the process 1100, or an alternative process. Operations represented by the illustrated blocks of the process 1100 may be performed by an RF front-end 128 or a portion thereof. More specifically, the operations of the process 1100 may be performed by first and second antenna feed lines 222-1 and 222-2, by at least one N-plexer 130 thereof, and/or by multiple paths 602-1 to 602-3 of the N-plexer 130.

At block 1102, a first portion of a signal is received via a first antenna. For example, the RF front-end 128 can receive a first portion 220-1 of a signal 220 via a first antenna 122-1. In an example signal-receiving scenario, the first antenna 122-1 may be energized by a wireless signal 220 (e.g., an RF signal) traveling through the air, and the RF front-end 128 may accept from the first antenna 122-1 the first portion 220-1 thereof.

At block 1104, a second portion of the signal is received via a second antenna. For example, the RF front-end 128 can receive a second portion 220-2 of the signal 220 via a second antenna 122-2. For instance, the second antenna 122-2 may be energized by the wireless signal 220 traveling through the air, and the RF front-end 128 may accept from the second antenna 122-2 the second portion 220-2 thereof. The first and second antennas 122-1 and 122-2 may be electromagnetically coupled together (e.g., galvanically isolated) due to physical proximity.

At block 1106, the first portion of the signal is propagated along a first antenna feed line corresponding to at least one first frequency band. For example, the RF front-end 128 can propagate the first portion 220-1 of the signal 220 along a first antenna feed line 222-1 corresponding to at least one first frequency band 304-1. The first antenna feed line 222-1 may filter the first portion 220-1 to pass signals within the first frequency band 304-1 to a receiver unit 234 of a first transceiver unit 202-1.

At block 1108, the second portion of the signal is propagated along a second antenna feed line comprising an N-plexer, which includes a first path and a second path. For example, the RF front-end 128 can propagate the second portion 220-2 of the signal 220 along a second antenna feed line 222-2 comprising an N-plexer 130, which includes a first path 602-1 and a second path 602-2. To do so, the second antenna feed line 222-2 may establish a first signal path through the N-plexer 130 using the first path 602-1 and the second path 602-2.

The propagation can include one or more routing operations, as shown at blocks 1110-1112. At block 1110, the second portion is routed along the first path to a node. For example, the N-plexer 130 can route the second portion 220-2 along the first path 602-1 to a node 604. The N-plexer 130 may be realized as a lumped-element N-plexer with multiple lumped elements, including one or more disposed along the first path 602-1 that partially condition the second portion 220-2.

At block 1112, the second portion is routed from the node along the second path corresponding to a second frequency band, including reflecting a part of the second portion that corresponds to the first frequency band. For example, the N-plexer 130 can route the second portion 220-2 from the node 604 along the second path 602-2 corresponding to a second frequency band 304-2. This routing can include a resonator 302 reflecting a part of the second portion 220-2 that corresponds to the first frequency band 304-1. The routing may also include filtering the second portion 220-2 to pass the second frequency band 304-2 (e.g., to a receiver unit 234 of a second transceiver unit 202-2) and applying the second portion 220-2 to the resonator 302. The resonator 302 may be coupled in series along a wireline of the second path 602-2 or between the wireline and a ground 906 in a shunt configuration. The reflection may include the resonator 302 substantially reflecting the part of the second portion 220-2 that corresponds to the first frequency band 304-1 back toward the second antenna 122-2, which can further reflect the part of the second portion 220-2 to the first antenna 122-1.

In some implementations, the N-plexer further includes a third path. The second antenna feed line 222-2 may establish a second signal path through the N-plexer 130 using the first path 602-1 and the third path 602-3. If so, the propagation of the second portion can include routing the second portion from the node along the third path corresponding to a third frequency band. For example, the N-plexer 130 can route the second portion 220-2 from the node 604 along the third path 602-3 corresponding to a third frequency band 304-3. The third path 602-3 may filter the second portion 220-2 to pass signals within the third frequency band 304-3 to at least a receiver unit 234 of a first transceiver unit 202-3. In some aspects, the routing of the second portion 220-2 from the node 604 along the third path 602-3 may include reflecting another part of the second portion 220-2 that corresponds to another frequency band 304 using another resonator 302.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Further, items represented in the accompanying figures and terms discussed herein may be indicative of one or more items or terms, and thus reference may be made interchangeably to single or plural forms of the items and terms in this written description. Finally, although subject matter has been described in language specific to structural features or methodological operations, it is to be understood that the subject matter defined in the appended claims is not necessarily limited to the specific features or operations described above, including not necessarily being limited to the organizations in which features are arranged or the orders in which operations are performed.

What is claimed is:

1. An apparatus comprising:
a first antenna;
a second antenna;
a first receiver unit tuned to a first frequency band;
a second receiver unit tuned to a second frequency band;
a first antenna feed line coupled between the first antenna and the first receiver unit; and
a second antenna feed line coupled between the second antenna and the second receiver unit, the second antenna feed line comprising an N-plexer that includes:
a first path coupled to the second antenna; and
a second path coupled to the second receiver unit, the second path including multiple circuit elements coupled along the second path that form a filter configured to pass signals corresponding to the second frequency band, the multiple circuit elements forming the filter including a resonator configured to present a capacitive response with regard to signals corresponding to the second frequency band, the resonator further configured to cause the first frequency band to be reflected.

2. The apparatus of claim 1, wherein the first antenna and the second antenna are positioned sufficiently proximate to each other such that the first antenna and the second antenna are electromagnetically coupled.

3. The apparatus of claim 1, wherein:
a filter passband of the filter at least partially overlaps the first frequency band.

4. The apparatus of claim 1, wherein the resonator is coupled along the second path in series with a portion of the multiple circuit elements.

5. The apparatus of claim 1, wherein the resonator is coupled along the second path between a wireline of the second path and a ground.

6. The apparatus of claim 1, wherein the resonator is configured to provide a notch frequency response that passes the second frequency band and attenuates the first frequency band.

7. The apparatus of claim 6, wherein the resonator comprises an acoustic wave device.

8. The apparatus of claim 7, wherein the acoustic wave device comprises at least one of a surface acoustic wave (SAW) device or a bulk acoustic wave (BAW) device.

9. The apparatus of claim 1, wherein:
the resonator is configured to present an open circuit response with regard to signals corresponding to the first frequency band.

10. The apparatus of claim 1, wherein:
the resonator is configured to provide a short circuit response with regard to signals corresponding to the first frequency band.

11. The apparatus of claim 1, further comprising:
a third receiver unit tuned to a third frequency band;
a fourth receiver unit tuned to a fourth frequency band, wherein
the first antenna feed line is coupled between the first antenna and the fourth receiver unit;
the second antenna feed line is coupled between the second antenna and the third receiver unit;
the N-plexer includes a third path coupled to the third receiver unit;
the resonator of the second path of the N-plexer comprises a first resonator; and
the third path of the N-plexer includes a second resonator configured to cause the fourth frequency band to be reflected.

12. The apparatus of claim 11, wherein:
the third path of the N-plexer includes at least one wireline;
the third path of the N-plexer includes other multiple circuit elements coupled along the wireline;
at least a portion of the other multiple circuit elements is configured to pass signals corresponding to the third frequency band;
another portion of the other multiple circuit elements is configured to provide at least a portion of an impedance match for the third receiver unit; and
the second resonator is coupled between the wireline and a ground.

13. The apparatus of claim 1, wherein:
the first frequency band corresponds to a navigational band of a global navigation satellite system (GNSS); and
the second frequency band corresponds to a cellular band of a cellular wireless standard.

14. The apparatus of claim 1, wherein the N-plexer is configured to provide:
a first signal path along the first path and the second path; and
a second signal path along the first path and a third path coupled to a third receiver unit.

15. The apparatus of claim 1, wherein:
the multiple circuit elements include a first capacitor, a second capacitor, and a first inductor, wherein the resonator is electrically coupled in series with the first capacitor and the second capacitor.

16. The apparatus of claim 15, wherein:
wherein the resonator is electrically coupled between the first capacitor and the second capacitor.

17. The apparatus of claim 15, wherein:
the resonator is configured to provide a notch frequency response that attenuates the first frequency band and that for signals corresponding to the second frequency band, the resonator forms a portion of a total capacitance of the filter configured to pass signals corresponding to the second frequency band.

18. The apparatus of claim 15, wherein:
wherein the N-plexer further comprises a third path coupled to the first path and coupled between the first path and a third receiver unit, the third path including a second inductor, a third inductor, and a third capacitor.

19. The apparatus of claim 1, wherein:
the second path is coupled to the first path to establish a signal path between the second antenna and the second receiver unit.

20. A system for N-plexer filtering for coupled antennas, the system comprising:
a first antenna;
a second antenna;
a first receiver unit tuned to a first frequency band;
a second receiver unit tuned to a second frequency band;
a third receiver unit tuned to a third frequency band;
a first antenna feed line coupled between the first antenna and the first receiver unit; and
a second antenna feed line coupled between the second antenna and both the second receiver unit and the third receiver unit, the second antenna feed line comprising an N-plexer including multiple circuit elements coupled along a first path between the second antenna and the second receiver unit, the multiple circuit elements forming a filter configured to pass signals corresponding to the second frequency band, the multiple circuit elements forming the filter including first resonation means for rejecting the first frequency band and for presenting a capacitive response with regard to signals corresponding to the second frequency band.

21. The system of claim 20, wherein the first resonation means comprises acoustic wave means for functioning as an open circuit for signals having a frequency within the first frequency band.

22. The system of claim 20, wherein the N-plexer includes:
a second path coupled between the second antenna and the third receiver unit.

23. The system of claim 22, further comprising:
a fourth receiver unit tuned to a fourth frequency band, wherein
the first antenna feed line is coupled between the first antenna and the fourth receiver unit;
the second path of the N-plexer includes second resonation means for rejecting the fourth frequency band; and
the first resonation means is configured to attenuate the first frequency band and pass the second frequency band.

24. The system of claim 20, wherein:
the first frequency band corresponds to a navigational band of a global navigation satellite system (GNSS); and
the second frequency band corresponds to a cellular band of a cellular wireless standard.

25. An apparatus for filtering, the apparatus comprising:
a diplexer including:
a first filter coupled between an input node and a first port, the first filter comprising a first capacitor, a second capacitor, and a first shunt inductor coupled to a node between the first capacitor and the second capacitor;
a resonator coupled in series to the first capacitor and the second capacitor and having a notch frequency response that attenuates a first frequency band and passes a second frequency band, the first filter configured to pass signals within the second frequency band, the first filter including a filter passband that includes the second frequency band and the first frequency band; and
a second filter coupled between the input node and a second port.

26. The apparatus of claim 25, wherein:
the resonator comprises an acoustic wave device.

* * * * *